United States Patent [19]

Shiraki et al.

[11] Patent Number: 5,332,784
[45] Date of Patent: Jul. 26, 1994

[54] TERMINAL-MODIFIED BLOCK COPOLYMER AND COMPOSITIONS CONTAINING THE SAME

[75] Inventors: Toshinori Shiraki, Yamato; Yasuo Hattori, Yokohama, both of Japan

[73] Assignee: Asahi Kasei Kogyo Kabushiki Kaisha, Osaka, Japan

[21] Appl. No.: 882,020

[22] Filed: May 13, 1992

Related U.S. Application Data

[60] Division of Ser. No. 373,677, Jun. 29, 1989, Pat. No. 5,115,035, which is a continuation of Ser. No. 939,483, Nov. 25, 1986, abandoned.

[30] Foreign Application Priority Data

Oct. 11, 1985 [JP] Japan ................ 60-224086
Nov. 19, 1985 [JP] Japan ................ 60-257739
Jan. 31, 1986 [JP] Japan ................ 61-181951
Jun. 5, 1986 [JP] Japan ................ 61-129179

[51] Int. Cl.$^5$ .......... C08F 297/04; C08L 53/02
[52] U.S. Cl. .................. 525/98; 525/250; 525/271; 525/293; 525/314; 523/217; 524/273; 524/274; 524/505
[58] Field of Search .......... 525/98, 250, 271, 293, 525/314, 341, 350, 379; 523/217; 524/273, 274, 505

[56] References Cited

U.S. PATENT DOCUMENTS

| | | | |
|---|---|---|---|
| 3,109,871 | 11/1963 | Zelinski et al. | 525/379 |
| 3,178,398 | 4/1965 | Strobel et al. | |
| 3,244,664 | 4/1966 | Zelinski et al. | |
| 3,251,812 | 5/1966 | Hsieh | 525/340 |
| 3,322,738 | 5/1967 | Uraneck et al. | |
| 3,458,600 | 7/1969 | Mann | |
| 3,471,431 | 10/1969 | Mann et al. | |
| 3,607,976 | 9/1971 | Hsieh et al. | 525/382 |
| 3,830,855 | 8/1974 | Inomata et al. | 525/379 |
| 3,838,108 | 9/1974 | Hergenrother et al. | |
| 3,862,097 | 1/1975 | Milkovich et al. | |

(List continued on next page.)

FOREIGN PATENT DOCUMENTS 0001547 5/1979 European Pat. Off. .

(List continued on next page.)

OTHER PUBLICATIONS

Flory, P. J. "Principles of Polymer Chemistry", Ithaca, Cornell Univ. Press, 1953, pp. 310–313.
European Search Report Jul. 1992.

Primary Examiner—Vasu S. Jagannathan
Attorney, Agent, or Firm—Birch, Stewart, Kolasch & Birch

[57] ABSTRACT

A terminal-modified block copolymer having the rest of an amino group or imido group-containing terminal-treating agent bonded to the polymer terminal which is obtained by treating the active terminal of a block copolymer comprising conjugated dienes and vinylaromatic hydrocarbon compounds which is obtained by using as the polymerization initiator at least one member selected from alkali metals or organoalkali metals and has a vinylaromatic hydrocarbon content of 5 to 95% by weight and a number average molecular weight of 5,000 to 1,000,000 with at least one terminal-treating agent selected from imide compounds, cyanamide compounds, aziridinyl compounds, amide compounds, or tertiary amino group-containing compounds other than said compounds; and an adhesive composition excellent in tackiness, adhesiveness, and creep resistance characteristic which comprises said block copolymer and a tackifier resin, 9 water-absorbing composition comprising said block copolymer and a highly water-absorbing resin, a thermoplastic resin composition comprising said block copolymer and a thermoplastic resin, and an electroconductive composition comprising said block copolymer and an electroconductive material.

18 Claims, No Drawings

U.S. PATENT DOCUMENTS

| | | |
|---|---|---|
| 4,020,036 | 4/1977 | South, Jr. . |
| 4,051,199 | 9/1977 | Udipi et al. .................. 525/387 |
| 4,070,344 | 1/1978 | Hergenrother et al. . |
| 4,131,653 | 12/1978 | Hsieh et al. . |
| 4,178,275 | 12/1979 | Hsieh et al. .................. 525/98 |
| 4,244,862 | 1/1981 | Handa et al. . |
| 4,330,449 | 5/1982 | Maldonado et al. . |
| 4,393,170 | 7/1983 | Haws . |
| 4,409,357 | 10/1983 | Milkovich ...................... 525/98 |
| 4,622,357 | 11/1986 | Tsuchida et al. .............. 524/274 |

FOREIGN PATENT DOCUMENTS

| | | |
|---|---|---|
| 37-8190 | 7/1962 | Japan . |
| 38-342 | 1/1963 | Japan . |
| 38-23043 | 10/1963 | Japan . |
| 39-92 | 1/1964 | Japan . |
| 42-24174 | 11/1967 | Japan . |
| 44-17037 | 7/1969 | Japan . |
| 45-41518 | 12/1970 | Japan . |
| 46-15108 | 4/1971 | Japan . |
| 47-11486 | 6/1972 | Japan . |
| 47-43618 | 11/1972 | Japan . |
| 49-66743 | 6/1974 | Japan . |
| 50-56426A | 5/1975 | Japan . |
| 50-75651 | 6/1975 | Japan . |
| 54-16558 | 2/1979 | Japan . |
| 54-126255 | 10/1979 | Japan . |
| 56-10542 | 2/1981 | Japan . |
| 56-38344 | 4/1981 | Japan . |
| 56-62847 | 5/1981 | Japan . |
| 56-100840 | 8/1981 | Japan . |
| 56-49958 | 11/1981 | Japan . |
| 58-89672 | 5/1983 | Japan . |
| 60-41092 | 9/1985 | Japan . |
| 61-143461 | 7/1986 | Japan . |
| 2063891 | 6/1981 | United Kingdom . |

TERMINAL-MODIFIED BLOCK COPOLYMER AND COMPOSITIONS CONTAINING THE SAME

This application is a divisional of copending application Ser. No. 07/373,677, filed on Jun. 29, 1989 now U.S. Pat. No. 5,115,035, which is a continuation of application Ser. No. 06/939,483 filed on Nov. 25, 1986, now abandoned, the entire contents of which are hereby incorporated by reference.

TECHNICAL FIELD

The present invention relates to a terminal-modified block copolymer having the remainder of an amino group- or imido group-containing a terminal-treating agent bonded the polymer terminal and to the use of the block copolymer. More particularly, the invention relates to said block copolymer itself, and to an adhesive composition having excellent tackiness, adhesive properties and creep resistance which comprises the block copolymer and a tackifier resin; a water-absorbing having excellent water absorbing properties, water-swelling properties, water-holding properties as well as mechanical strength including tensile strength and impact resistance which comprises the block copolymer and a highly water-absorbing resin; a thermoplastic resin composition having excellent compatibility, mechanical strength and other properties which comprises the block copolymer and a thermoplastic resin; and an electroconductive composition excellent in tensile strength, impact resistance and other properties which comprises the block copolymer and an electroconductive material.

BACKGROUND OF THE INVENTION

Many developments have already been disclosed with regard to polymers containing terminal functional groups. For example, a number of methods are already known which can attach a functional group to the terminal of the molecule of liquid rubber or polybutadiene by the use of an anionic polymerization technique. For instance, Japanese Patent Application Kokoku (Post-Exam. Publn.) Nos. S190/62, 342/63, 23,043/63, 24,174/67 and 15,108/71 disclose processes for producing terminal functional group-containing polymers by treating polymers polymerized by use of an organolithium compound etc. with carbon dioxide, epoxy compounds, thioepoxy compounds etc.

Further, U.S. Pat. No. 3,471,431 discloses a terminal-sulfonated polymer obtained by the reaction of a block copolymer with a sultone. U.S. Pat. Nos. 3,838,108 and 4,070,344 disclose amine-terminal polymers obtained by reacting polyisocyanate or polyisothiocyanate to the terminal of a living polymer. U.S. Pat. No. 4,244,862 discloses a coating composition and a printing ink composition which comprise a polymer containing a terminal polar group obtained by treating a living polymer of a block copolymer with a polar group-containing compound and an inorganic pigment compounded therewith. U.S. Pat. Nos. 4,020,036 and 4,330,449 disclose compositions comprising a block copolymer having a carboxyl group at the polymer terminal compounded with a thermosetting unsaturated polyester or asphalt.

As to the applications of styrene/butadiene block copolymers and styrene/isoprene block copolymers, particularly as to their use as tackifier compositions, water absorbing compositions, thermoplastic compositions, and electroconductive compositions, the following techniques have been disclosed.

Pressure sensitive adhesive agents have hitherto been used in various applications including pressure sensitive adhesive tapes and labels. The adhesive agent is applied onto tapes or the like materials generally by coating the solution of the adhesive agent in a solvent on a substrate by such means as a roll or spray. However, the use of solvents involves many problems from the viewpoints of atmospheric pollution, fire, industrial environmental hygiene, etc., which have been viewed as serious social problems in recent years. As a result, a hot melt pressure sensitive adhesive agent of the solventless type has recently attracted attention as a means for obviating such difficulties.

A variety of polymers are used as the base polymer of the hot melt adhesive, including ethylene-vinyl acetate copolymers, block copolymers comprising conjugated dienes and vinyl aromatic hydrocarbon compounds, ethylene α-olefin copolymers and polyester resins. Particularly, the block copolymers tend to be preferably used because they show a fairly good balance between tackiness and creep resistance. For example, Japanese Patent Application Kokoku (Post-Exam. Publn.) Nos. 17,037/69 and 41,518/70 disclose adhesive compositions comprising such linear block copolymers as polystyrene-polybutadiene-polystyrene or polystyrene-polyisoprene-polystyrene. Japanese Patent Application Kokoku (Post-Exam. Publn.) No. 49,958/81 discloses a hot-melt type adhesive composition using a branched block copolymer, (polystyrene-polybutadiene) $_n$X.

Further, rubber compositions formed by compounding natural or synthetic rubber with polyvinyl alcohol, polyacrylic acid salts, carboxymethylcellulose, hydroxyethylcellulose and the like each added as a water absorbing substance are disclosed, for example, in Japanese Patent Application Kokai (Laid-Open) Nos. 143,653/78, 7,461/79, 7,463/79 and 20,066/79. They are useful as water-swelling materials, such as water-stopping materials, in the field of civil engineering, construction, etc. since they absorb water and expand.

However, since conventional water-swelling materials employ natural rubber or usual synthetic rubber as the rubber component, the compounds require a vulcanization operation using sulfur, peroxides or the like substances, which makes their fabrication complicated. In order to obviate such difficulties, attempts have been made to incorporate a water absorbing substance into a thermoplastic elastomer which has at room temperature an elasticity similar to that of vulcanized natural or synthetic rubber without being vulcanized and yet shows at a high temperature a processability similar to that of thermoplastic resin. For example, Japanese Patent Application Kokoku (Post-Exam. Publn.) No. 41,092/85 discloses a composition which comprises a thermoplastic elastomer formed out of styrene and butadiene compounded with a water-swelling solid cross-linked product of a copolymer of lower olefin and maleic anhydride.

In using high molecular substances as the material of fiber, film, sheets, molded articles, etc., when the use of a single high molecular substance is unsatisfactory for the object of the product, many attempts have been made to give satisfactory strength, to improve processability, or to reduce the cost of the product by forming a composition comprising a number of components or forming a laminate. However, when different kinds of high molecular substances are mixed into a composition, the number of combinations obtainable is rather small which shows a good compatibility.

Mixed compositions of different kinds of high molecular substances with poor compatibility often fail to attain the improvement in properties intended by the mixing because of a lack of homogeneity and peeling between different phases which are caused by poor miscibility.

It is well known that styrene-butadiene block copolymer, styrene-isoprene block copolymer, and like polymers are used as one component to obtain a composition with excellent properties by mixing high molecular substances. Examples of such methods are disclosed, for example, in Japanese Patent Application Kokai (Laid-Open) Nos. 11,486/72, 66, 743/74, 75,651/75, 126,255/79, 10,542/81, 62,847/81 and 100,840/81.

As to the method for imparting electroconductivity to elastomers and thermoplastic resins, there are known those methods which comprises incorporating thereto electroconductive materials such as carbon black, graphite powder, metal powder, and metal fiber. Since the range of conductivity of the electroconductive composition obtained by such methods can be controlled according to the kind, shape and compounded amount of the electroconductive material used therein, such compositions are widely used, as an antistatic material or an electroconductive material depending on their level of electroconductivity, in antistatic carpets, ruggs, flooring, shoe soles, medical rubber goods, electromagnetic interference materials, and so forth.

Electroconductive elastomers mainly used at present are those which comprise principally silicone rubber or fluorosilicone rubber. However, a strong need is present for materials which are less expensive and better in processability as electroconductive materials become more widely used. Under such situations, block copolymers of butadiene or isoprene and styrene are attracting attention as the raw material for electroconductive materials because when the styrene content is low they have at ordinary temperature a similar elasticity to that of vulcanized natural or synthetic rubber even without being vulcanized and at high temperature they can be fabricated similarly to conventional thermoplastic resins, whereas when the styrene content is high they nave properties of thermoplastic resins excellent in impact resistance. For example, Japanese Patent Application Kokai (Laid-Open) No. 16,558/79 discloses an electroconductive plastic composition comprising a thermoplastic radial teleblock copolymer of butadiene and styrene compounded with carbon black.

DISCLOSURE OF THE INVENTION

In view of the circumstances mentioned above, the present inventors have made extensive studies to find a block copolymer which has a good compatibility, particularly a good compatibility with polymers having polar functional groups and can also exhibit excellent characteristics in its applications. As a result, it has been found that a block copolymer whose molecular chain terminal has been modified with a specified terminal-treating agent has the above-mentioned characteristics. This invention has been accomplished on the basis of the above finding. Known amine-terminal polymers mentioned above use polyisocyanate or polyisothiocyanate as a modifier. Since these compounds readily react with moisture etc. in the air, they are liable to cause operational problems. As contrasted thereto, the present inventors have found that when the active terminal of a block copolymer is treated with at least one terminal-treating agent selected from imide compounds, cyanamide compounds, aziridinyl compounds, amide compounds, or tertiary amino group-containing compounds other than the compounds to obtain a polymer which has the rest of the amino group- or imino group-containing terminal-treating agent bonded to the polymer terminal, the resulting product is a novel compound not described in the literature, is easy to use because it is free from the defects mentioned above, and hence is of great industrial importance. Thus, the present invention has been accomplished on this basis.

Further, as to the use of block copolymers, the present inventors have found a block copolymer which has a marked effect in correcting or eliminating the defects described below in various fields of application, and have thus accomplished this invention.

Conventional adhesive compositions have the following defects and are unsatisfactory in their performance as a hot melt pressure sensitive adhesive agent. Thus, block copolymers comprising styrene and butadiene have low initial tack, and decrease their creep resistance when a large amount of softening agent is compounded therewith to improve the initial tack. On the other hand, block copolymers comprising styrene and isoprene are better in initial tack than the aforesaid block copolymers and are recently used in the field of pressure sensitive adhesive tapes and pressure sensitive adhesive labels, but are poor in creep resistance. Pressure sensitive adhesive tapes and the like using an adhesive of low creep resistance develop a shear in the adhesive layer and cause troubles when used under conditions such that they are subjected to stress, for example at the opening and closing part of a corrugated board box, or used at high ambient temperature in summer. Accordingly, their improvement is eagerly awaited.

Also in water absorbing compositions, there are problems in that thermoplastic elastomers comprising styrene and butadiene also show an unsatisfactory compatibility with water absorbing substances and hence, particularly when a large amount of water absorbing substance is incorporated, the resulting compounds have low strength and are easily damaged or the water absorbing substance falls off therefrom in water, which makes it difficult to attain the desired degree of swelling.

Also in compositions with thermoplastic resins, conventional block copolymers are poorly compatible with polymers having polar functional groups such as styrene-methacrylic acid copolymer, styrene-maleic anhydride copolymers, polyamide, polyester, and polyurethane; consequently the compounding of the block copolymers with the latter polymers cannot exhibit a satisfactory improving effect and fails to yield a useful mixed composition.

Further, when an electroconductive material is incorporated into block copolymers comprising butadiene or isoprene and styrene, particularly when the incorporated amount is large, there occur such problems as decreased tensile strength and impact resistance of the resulting compound or deterioration of rubberlike properties of the compound. Accordingly, the solutions to such problems are eagerly awaited.

In other words, the present inventors have made extensive studies to provide a composition excellent in tackiness and adhesiveness by improving the creep resistance of an adhesive composition comprising a block copolymer formed out of conjugated diene and vinyl aromatic hydrocarbon compounded therein, particularly of a hot melt adhesive composition; a water absorbing composition excellent in water-absorbing property, water-swelling property, water-holding property and mechanical strength; a composition comprising a thermoplastic polymer, particularly a polar thermoplastic polymer having a polar functional group, and a block copolymer which composition is improved in compatibility of the two component polymers and in mechanical strength, etc.; and a composition comprising a block copolymer and an electroconductive material compounded therewith which composition has improved mechanical strength etc. Accordingly, the inventors have found that the above-mentioned objects can be attained by using a block copolymer whose polymer chain terminal has been modified with a specified terminal-treating agent, and thus accomplished this invention.

An object of this invention is to provide a novel terminal-modified block copolymer having the rest of an amino group- or imino group-containing terminal-treating agent bonded to the polymer terminal, and a process for producing the same. Another object is to provide a novel composition comprising the block copolymer compounded with tackifier resin, highly water-absorbing resin, thermoplastic resin, or electroconductive materials wherein the above-mentioned various difficulties are obviated.

Thus, one aspect of this invention relates to a terminal-modified block copolymer having the rest of an amino group- or imido group-containing terminal-treating agent bonded to the polymer terminal, obtained by treating the active terminal of a block copolymer comprising conjugated dienes and vinylaromatic hydrocarbon compounds which is obtained by use of at least one member selected from alkali metals and organoalkali metals as the polymerization initiator and has a vinylaromatic hydrocarbon content of 5 to 95% by weight and a number average molecular weight of 5,000 to 1,000,000 with at least one terminal-treating agent selected from imine compounds, cyanamide compounds, aziridinyl compounds, amide compounds, or tertiary amino group containing compounds other than the compounds, and to the process for producing the same.

Another aspect of this invention relates to a composition comprising (a) 2 to 98 parts by weight of a terminal-modified block copolymer having the rest of a terminal-treating agent bonded to the polymer terminal which is obtained by treating the active terminal of a block copolymer comprising conjugated dienes and vinylaromatic hydrocarbon compounds which is obtained by use of at least one member selected from alkali metals and organoalkali metals as a polymerization initiator and has a vinylaromatic hydrocarbon content of 5 to 95% by weight and a number average molecular weight of 5,000 to 1,000,000 with at least one terminal-treating agent selected from compounds containing at least one functional group represented by the following general formula

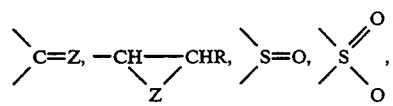

-continued

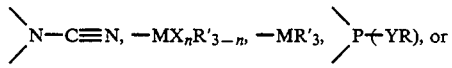

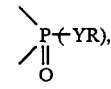

wherein R is hydrogen, an alkyl group of 1 to 22 carbon atoms, aryl group of 6 to 22 carbon atoms, or arylalkyl group; R' is the same as R or is an alkoxy group; M is silicon or tin; X is a halogen; Y is oxygen or sulfur, Z is oxygen, sulfur, or N, and n is an integer of 1 to 3, or compounds represented by the general formula

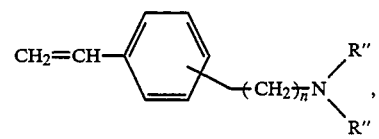

wherein R" is an alkyl group of 1 to 22 carbon atoms, cycloalkyl group, arylalkyl group, aryl group, or substituted aryl group; and n is an integer of 0 to 6, and (b) 98 to 2 parts by weight of a resinous substance or an electroconductive substance.

BEST MODE FOR CARRYING OUT THE INVENTION

This invention will be described in detail below.

The terminal-modified block copolymer of this invention is prepared by treating a block copolymer comprising conjugated dienes and vinylaromatic hydrocarbon compounds which is obtained by copolymerizing a conjugated diene and a vinylaromatic hydrocarbon in the presence of an alkali metal or organoalkali metal, a polymerization initiator, and contains an alkali metal on at least one terminal of the polymer with a specified terminal-treating agent capable of reacting with the alkali metal present at the terminal of the polymer.

The conjugated dienes used in this invention are diolefins having a pair of conjugated double bonds and include, for example, 1,3-butadiene, 2-methyl-1,3-butadiene (isoprene), 2,3-dimethyl-1,3-butadiene, 1,3-pentadiene and 1,3-hexadiene, particularly common ones being 1,3-butadiene and isoprene. These dienes may be used not only singly but also as a mixture of two or more thereof. The vinylaromatic hydrocarbons used in this invention include, for example, styrene, o-methylstyrene, p-methylstyrene, p-tert-butylstyrene, 1,3-dimethyistyrene, α-methylstyrene, vinylnaphthalene, and vinylanthracene, a particularly common one being styrene. These may be used not only singly but also as a mixture of two or more thereof.

The alkali metals used as an initiator in this invention include, for example, lithium, sodium, and potassium. Examples of organoalkali metal compounds which can be used include alkyl or aryl-alkali metal compounds of lithium, sodium, potassium and the like, and chain compounds of these metals with naphthalene, anthracene and the like. Particularly preferred initiators include organomonolithium compounds, organodilithium compounds, and organopolylithium compounds. Specific examples thereof include ethyllithium, n-propyllithium, isopropyllithium, n-butyllithium, sec-butyllithium, tert-butyllithium, hexamethylenedilithium, butadienyldilithium, and isoprenyldilithium.

The block copolymer which comprises conjugated dienes and vinylaromatic hydrocarbon compounds and contains an alkali metal on at least one terminal can be prepared by any suitable methods known in the art, for example, those described in Japanese Patent Application Kokoku (Post-Exam. Pubin. ) Nos. 19,286/61, 17,979/68, 31,951/70, and 32,415/71.

These methods comprise block-copolymerizing a conjugated diene and a vinylaromatic hydrocarbon by using such an initiator as an organolithium compound, and Give a block copolymer having the structure represented by the formula

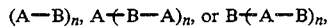

$(A-B)_n$, $A(B-A)_n$, or $B(A-B)_n$, wherein A is a polymer block mainly comprising vinylaromatic hydrocarbon compounds and B is a polymer block mainly comprising conjugated dienes, the boundary between block A and block B being not necessarily required to be distinctly defined; and n is an integer of 1 or more or

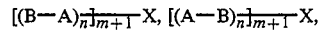

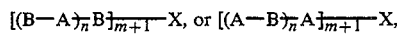

$[(B-A)_n]_{m+1}-X$, $[(A-B)_n]_{m+1}-X$, $[(B-A)_nB]_{m+1}-X$, or $[(A-B)_nA]_{m+1}-X$, wherein A and B are as defined above; X denotes such an initiator as a polyfunctional organolithium compound; and m and n are each an integer of 1 or more. In the above formulas, the term "polymer block mainly comprising vinylaromatic hydrocarbon compounds" means a copolymer block of a vinylaromatic hydrocarbon and a conjugated diene which contains 50% or more by weight of vinylaromatic hydrocarbon and/or a vinylaromatic hydrocarbon homopolymer block, and the term "polymer block mainly comprising conjugated dienes" means a copolymer block of a conjugated diene and a vinylaromatic hydrocarbon which contains more than 50% by weight of conjugated dienes and/or a conjugated diene homopolymer block.

The vinylaromatic hydrocarbon compounds in the copolymer block may be distributed either uniformly or in the form of a taper. The portion wherein the distribution is uniform and/or the portion wherein the distribution is in the form of a taper may be present in plurality within respective blocks.

The block copolymer used in this invention may be any suitable mixture of the block copolymers represented by the general formulas shown above.

Block copolymers particularly preferable in this invention are those which contain at least two polymer blocks mainly comprising vinylaromatic hydrocarbon compounds and at least one polymer block mainly comprising conjugated dienes. The use of such block copolymers provides thermoplastic polymer compositions excellent in mechanical strength.

Examples of the hydrocarbon solvents which can be used include aliphatic hydrocarbons such as butane, pentane, hexane, isopentane, heptane, octane, and isooctane; alicyclic hydrocarbons such as cyclopentane, methylcyclopentane, cyclohexane, methylcyclohexane, and ethylcyclohexane; and aromatic hydrocarbons such as benzene, toluene, ethylbenzene and xylene.

Further, polar compounds and randomizing agents can be used in producing the block copolymer. Examples of polar compounds and randomizing agents include ethers such as tetrahydrofuran, diethylene glycol dimethyl ether, and diethylene glycol dibutyl ether; amines such as triethylamine and tetramethylethylenediamine; thioethers, phosphines, phosphoramides, alkylbenzenesulfonates, and the alkoxide of potassium or sodium.

The block copolymer used in this invention has a vinylaromatic hydrocarbon content of 5 to 95% by weight, preferably 10 to 90% by weight, more preferably 15 to 85% by weight. When such block copolymer has a vinylaromatic hydrocarbon content of 60% by weight or less, preferably 55% by weight or less the copolymer exhibits the characteristic properties of a thermoplastic elastomer, whereas when the copolymer has a vinylaromatic hydrocarbon content of more than 60% by weight, preferably more than 65% by weight, it exhibits the characteristic properties of a thermoplastic resin. Thus, the block copolymer has preferably the content of 5 to 60% by weight as a thermoplastic elastomer and the content of more than 60% by weight and not more than 95% by weight as a thermoplastic resin.

The block copolymer used in this invention has a number average molecular weight of 5,000 to 1,000,000, preferably 10,000 to 800,000, more preferably 30,000 to 500,000.

The block copolymer containing an alkali metal on at least one terminal obtained by the method described above is then treated with a specified terminal-treating agent capable of reacting with the alkali metal present at the polymer terminal. The specified terminal-treating agent used in this invention refers to at least one compound selected from imine compounds, cyanamide compounds, aziridinyl compounds, amide compounds, and tertiary amino group-containing compounds other than those mentioned above the rest of which compound is capable of bonding to the polymer terminal after the reaction of the compound with the alkali metal present at the polymer terminal.

The imine compound is a compound which has at least one —C=N— linkage or —N=C=N— linkage (carbodiimide linkage) in the molecule. Specific examples thereof include benzylidenaniline, anisalaniline, 4-methoxybenzylidene-4-n-butylamine, 4-methoxybenzylidene-4-acetoxyaniline, benzylidenethylamine, benzylideneazine, N-trimethylsilylbenzylideneamine, N-trimethylsilylbenzylideneamine, N-trimethylsilyl(1-phenylbenzylidene)amine, N-butylidenebenzenesulfenamide, N-isopropylidenebenzenesulfenamide, N-benzylidenebenzenesulfenamide, N-ethylidenebenzenesulfenamide, N-(α-phenylbenzylidene)benzenesulfenamide, and N-(α-methylbenzylidene)benzenesulfenamide. Examples of carbodiimides include dimethylcarbodiimide, diethylcarbodiimide, dipropylcarbodiimide, dibutylcarbodiimide, dihexylcarbodiimide, dicyclohexylcarbodiimide dibenzylcarbodiimide, diphenylcarbodiimide, methylpropylcarbodiimide, butylcyclohexylcarbodiimide, ethylbenzylcarbodiimide, propylphenylcarbodiimide, and phenylbenzylcarbodiimide. Particularly preferable of these are benzylidenaniline, anisalaniline, 4-methoxybenzylidene-4-n-butylaniline, 4-methoxybenzylidene-4-acetoxyaniline, N,N'-dicyclohexylcarbodiimide, N,N'-diphenylcarbodiimide, and N-cyclohexyl-2-benzothiazylsulfeneamide.

The cyanamide compound is a compound which has at least one =N—C=N linkage in the molecule. Specific examples thereof include dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenytcyanamide, and phenylbenzylcyanamide. Particularly preferable among these are dicyclohexylcyanamide and diphenylcyanamide.

The aziridinyl compound is a compound which has at least one aziridinyl group in the molecule. Specific examples thereof include tri(1-aziridinyl)phosphine oxide, tri(2-methyl-1-aziridinyl)phosphine oxide, tri(2-ethyl-3-decyl-1-aziridinyl)phosphine sulfide, tri(2-phenyl-1-aziridinyl)phosphine oxide, tri(2-methyl-3-cyclohexyl-1-aziridinyl)phosphine sulfide, 2,4,6-tri(aziridinyl)-1,3,5-triazine, 2,4,6-tri(2-methyl-1-aziridinyl)-1,3,5-triazine, 2,4,6-tri(1-aziridinyl)-2,4,6-triphospha-1,3,5-triazine, and 2,4,6-tri (2-methyl-n-butylaziridinyl)-2,4,6-triphospha-1,3,5-triazine. Particularly preferable among these are di(2-methyl-1-aziridinyl)phenylphosphine oxide, tri(2-methyl-1-aziridinyl)phenylphosphine oxide, and 2,4,6-tri(aziridinyl)-1,3,5-triazine The amide compound is a compound which has at least one

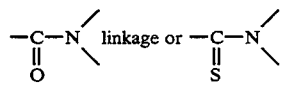

linkage in the molecule. Specific examples thereof include N,N-dimethylformamide, N,N-dimethylthioformamide, N,N-dimethyl-N', N'-(p-dimethylamino)benzamide, N-ethyl-N-methyl-8-quinolinecarboxamide, N,N'-dimethylnicotinamide, N,N-dimethylmethacrylamide, N-methylphthalimide, N-phenylphthalimide, N-acetyl-ε-caprolactam, N-methyl-ε-caprolactam, N,N,N'N'-tetramethylphthalamide, 10-acetylphenoxazine, 3,7-bis(diethylamino)-10-benzoylphenothiazine, 10-acetylphenothiazine, 3,7-bis(dimethylamino)-10-benzoylphenothiazine, N-ethyl-N-methyl-8-quinolinecarboxamide and further linear urea compounds such as N,N'-dimethylurea, N,N'-diethylurea, N,N'-dimethylethyleneurea, N,N,N',N'-tetramethylurea, N,N,N',N'-tetramethylthiourea, N,N-dimethyl-N',N'-diethylurea, and N,N-dimethyl-N',N'-diphenylurea. Specific examples of preferable amide compounds among hese are N,N-dimethylformamide, N,N-dimethylthioformamide, N,N,N',N'-tetramethylurea, N,N,N',N'-tetramethylthiourea, N,N'-dimethylnicotinamide, N,N-dimethyl-N',N'-(p-dimethylamino)benzamide, 3,7-bis(dimethylamino)-10-benzoylphenothiazine, and N-ethyl-N-methyl-8-quinolinecarboxamide. Further, as examples of other amide compounds, mention may be made of cyclic urea compounds such as 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-( 2-methoxyethyl)-2-imidazolidinone, 1,3-di ( 2-ethoxyethyl )-2-imidazolidinone, 1,3-dimethylethylenethiourea, N,N',N''-trimethylisocyanuric acid, and N,N',N''-triethylisocyanuric acid.

Further, there may be mentioned N-substituted lactams such as N-methylpyrrolidone, N-ethylpyrrolidone, N-phenylpyrrolidone, N-methyl-ε-caprolactam, N-ethyl-ε-caprolactam, and N-acetyl-ε-caprolactam; caffeine, 1-phenyl-3-methylpyrazolone, antipyrine, N-dimethylaminoantipyrine, N-phenylpyrazolone, N,N'-diphenylindigo, cryptopine, and tropinone. Particularly preferable among amide compounds are those which have an amido group incorporated into a ring structure, including ring-formed urea compounds and N-substituted lactams.

As examples of preferred compounds having an amido group in a ring structure, mention may be made of N-methylpyrrolidone, N-ethylpyrrolidone, 1,3-dimethyl-2-imidazolidinone, 1,3-diethyl-2-imidazolidinone, N-methyl-ε-caprolactam, N-acetyl-ε-caprolactam, and N,N',N''-trimethylisocyanuric acid.

"The tertiary amino group-containing compound other than the above-mentioned compounds" means a compound which has at least one specified functional group capable of reacting with an alkali metal present at the polymer terminal, contains at least one tertiary amino group, and leaves its remainder bonded to the polymer terminal after reacting with an alkali metal present at the polymer terminal. The tertiary amino group referred to herein means a functional group represented by the general formula

wherein $R_1$ and $R_2$ are the same or different and indicate an alkyl group of 1 to 22 carbon atoms, cycloalkyl group of 6 to 22 carbon atoms, aryl group of 6 to 22 carbon atoms, substituted aryl group, and arylalkyl group, or means a cyclic amino group having the general formula $>N-R_1$, provided that the pyridyl group is not included in the tertiary amino groups in this invention. As to the specified functional groups capable of reacting with an alkali metal present at the polymer terminal, there may be mentioned those selected from the following general formulas

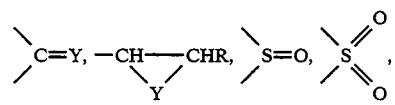

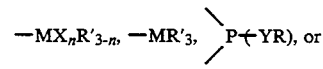

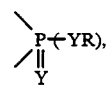

wherein R is hydrogen, an alkyl group of 1 to 22 carbon atoms, cycloalkyl group of 4 to 22 carbon atoms, aryl group of 6 to 22 carbon atoms, substituted aryl group, and arylalkyl group; R' is the same as R or is an alkoxy group; X is a halogen; Y is oxygen or sulfur; and n is an integer of 1 to 3, provided that those compounds which contain groups of the general formulas shown above as an amido group are excluded. Examples of preferred functional groups include a carbonyl group, thiocarbonyl group, ester group, thioester group, formyl group, thioformyl group, epoxy group, thioepoxy group, sulfinyl group, sulfonyl group, phosphite group, thiophosphite group, phosphate group, thiophosphate group, vinyl group, and vinylidene group.

Specific examples of the aforesaid compounds include 4,4'-bis(dimethylamino)benzophenone, 4,4'-bis(diethyl)benzophenone, 4,4'-bis(dibutylamino)benzophenone, 4-dimethylaminobenzophenone, 4,4'-bis(dimethylamino)thiobenzophenone, 4,4'-bis(diethylamino)thiobenzophenone, 4,4'-bis(dibutylamino)thiobenzophenone, 4-dimethylaminothiobenzophenone, p-dimethylaminobenzalacetophenone, 1,3-his(4'-dimethylaminobenzal)acetone, Malachite Green lactone, Crystal Violet lactone, 3-diethylamino-6-methyl-7-anisonofluoran, tropinone, cryptopine, hygrine, hydrastine, lobelanine, tetraglycidylmetaxylenediamine, tetraglycidyl-1,3-bisaminomethylcyclohexane, tetraglycidylaminodiphenylmethane, triglycidyl-p-aminophenol, triglycidyl-m-aminophenol, diglycidylaniline, diglycidyl-o-toluidine, 2-dimethylaminopropanesultone, 2-diethylaminobutanesultone, triethoxy(4-dimethylaminobutyl)silane, dimethylaminoethylacrylate, diethylaminoethylacrylate, and dioctylaminoethyl acrylate. Preferred among these are 4,4'-bis(dimethylamino)benzophenone, 4,4'-bis(diethylamino)benzophenone, 4,4'-bis(diethylamino)thiobenzophenone, p-dimethylaminobenzalacetophenone and 1,3-bis(4'-dimethylaminobenzal)acetone.

Compounds represented by the general formula

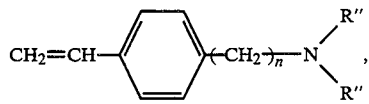

wherein R" is an alkyl group of 1 to 22 carbon atoms, cycloalkyl group, arylalkyl group, aryl group, and substituted aryl group; and n is an integer of 0 to 6. may also be favorably used. Specific examples thereof include dimethylaminoethylstyrene, diethylaminoethylstyrene, dibutylaminoethylstyrene, dioctylaminoethylstyrene, di-2-ethylhexylaminoethylstyrene, and dioctadecylaminoethylstyrene.

Of these tertiary amine-containing compounds, p-(2-dimethylaminoethyl)styrene, m-(2-dimethylaminoethyl)styrene, p-(2-diethylaminoethyl)styrene, and m-(2-diethylaminoethyl)styrene are preferable.

Isocyanate compounds or thioisocyanate compounds are excluded from the terminal-treating agents used in this invention.

It is preferable that the above-mentioned terminal-treating agent is added to every polymer chain terminal having an alkali metal bonded thereto. However, depending on various reaction conditions including the kind of the terminal-treating agent, the structure of polymer, solvents, reaction temperature, and reaction apparatus, the reaction of coupling between polymer molecules can sometimes take place, and in such a case the terminal-treating agent will be introduced into the center of the polymer molecule. In the present invention, however, the effect of improving characteristic properties described below can be recognized so long as 15% or more, preferably 30% or more, more preferably 60% or more, of the polymer terminals having an alkali metal bonded thereto are modified by the terminal-treating agent.

The terminal-treating agent is used in this invention in a proportion of 0.7 to 2 molecules, preferably 0.9 to 1.3 molecules, particularly preferably 1.0 molecule, relative to one atom of the alkali metal present at the polymer terminal.

The reaction temperature and the reaction time can be varied as desired over a wide range. Usually, the reaction temperature is in the range of 15° to 115° C. and the reaction time is in the range of 1 second to 3 hours.

The terminal-modified block copolymer thus obtained can also be further treated with water, alcohol. or other Lewis acids to replace the alkali metal portion with hydrogen. Even when the terminal-treating agent shows anionic polymerizability in the presence of an alkali metal catalyst, the agent is preferably used in the above-mentioned range of amount.

The terminal-modified block copolymer used in this invention may be, if necessary, hydrogenated beforehand.

The terminal-modified block copolymer according to this invention having an amino group-containing terminal-treating agent remainder bonded to the polymer terminal is combined with a resinous substance or an electroconductive substance into a composition thereby to exhibit its specific modification effect. The resinous substance referred to herein means at least one resinous substance selected from tackifier resins, highly water-absorbing resins, and thermoplastic resins. The adhesive composition comprising the terminal-modified block copolymer according to this invention and a tackifier resin has a compound creep resistance and is excellent in tackiness and adhesiveness. A combination of the block copolymer with a highly water-absorbing resin gives a water absorbing composition excellent in water-absorbing property, water-swelling property, water-holding property and mechanical strength. A combination with a thermoplastic resin, particularly polar thermoplastic polymer having a functional group gives a composition of improved compatibility and excellent mechanical strength and so forth. Further, when combined with an electroconductive substance, it gives an electroconductive composition excellent in tensile strength and impact resistance. In this invention, hereinafter, the above-mentioned terminal-modified block copolymer is referred to as component (a) and the resinous substance or the electroconductive substance as component (b). Among components (b), the resinous substances include tackifier resin, highly water-absorbing resin, and thermoplastic resin. The tackifier resin, one of the components (b) used in this invention, is one which is conventionally used as a tackifier in hot melt pressure sensitive adhesive agent and the like. Examples thereof include cumarone-indene resin, phenol resin, p-tert-butylphenol-acetylene resin, phenol-formaldehyde resin, terpene-phenol resin, polyterpene resin, xylene-formaldehyde resin, synthetic polyterpene resin, aromatic hydrocarbon resin, aliphatic cyclic hydrocarbon resin, oligomer of monoolefin or diolefin, hydrogenated hydrocarbon resin, hydrocarbon-type tackifier resin, polybutene, rosin ester of polyhydric alcohol, hydrogenated rosin, hydrogenated wood rosin, hydrogenated rosin ester of monoalcohol or polyhydric alcohol, and turpentine-type tackifiers. To go into more details, those which are described in "Gomu Purasutikku Haigo Yakuhin" (Chemicals for Rubber and Plastics Compound), edited by Rubber Digest Co., can be used. Particularly favorable tackifiers are terpene-type resin, aromatic-modified terpene hydrocarbon resin, alicyclic saturated hydrocarbon resin, rosin ester, disproportionated rosin ester, completely hydrogenated rosin ester, and modified aliphatic petroleum resin, and give compositions with good initial tackiness. The tackifier resin (b) is generally used in the range of 40 to 200 parts by weight, preferably 60 to 150 parts by weight, relative to 100 parts by weight of the terminal-modified block copolymer of component (a). A compounding amount of the tackifier resin outside the above-mentioned range is unfavorable because the resulting adhesive composition will give a pressure sensitive adhesive tape or the like poor in pressure sensitive adhesive property.

A softener (component (c)) may be used as required in this invention. The softeners of component (c) include petroleum-type softeners, paraffin, vegetable oil-type softeners (castor oil, cotton seed oil, rape seed oil, soybean oil etc.) and plasticizers. Specifically, those softeners which are described in above-mentioned "Chemicals for rubber and plastics compound" can be used. The softener of component (c) is generally used in an amount of 150 parts by weight or less, preferably in the range of 5 to 100 parts by weight, relative to 100 parts by weight of the terminal-modified block copolymer of component (a). An amount exceeding 150% by weight is unfavorable because the resulting adhesive composition will give a pressure sensitive adhesive tape or the like of decreased creep resistance.

In this invention, thermoplastic resins such as polystyrene, polyethylene, polypropylene, ethylene-propylene copolymer, ethylene-butene copolymer, ethylene-vinyl acetate copolymer, and further thermoplastic polyester-type resin of relatively low molecular weight, polyamide-type-resin, and polyphenylene ether-type resin can be compounded as a reinforcing resin in an amount of 50 parts weight or less, preferably 2 to 40 parts by weight, more preferably 5 to 30 parts by weight, relative to 100 parts by weight of the block copolymer of component (a) to improve the creep resistance and hardness. A compounding amount of the reinforcing resin exceeding 50 parts by weight is unfavorable because it causes a decrease of surface tackiness. In this invention, various stabilizers can be used according to necessity, which include, for example, phenol-type stabilizers, phosphorus-type stabilizers, sulfur-type stabilizers, amine-type stabilizers, and the mixture of these stabilizers.

The adhesive composition of this invention may be incorporated with conventional elastomers such as natural rubber, synthetic polyisoprene rubber, polybutadiene rubber, styrene-butadiene rubber, chloroprene rubber, ethylene-propylene rubber, acrylic rubber, polyisoprene-isobutylene rubber, and polypentenamer rubber so long as the incorporation is not harmful to the characteristic property of an adhesive.

The highly water-absorbing resin, one of the components (b) used in this invention, should have a water absorbtion factor of the resin itself of 20- to 1000-fold, preferably 50- to 500-fold. The term "water absorbtion factor of highly water-absorbing resin" used herein means the saturation amount of absorbed water (expressed in g) per 1 g of the highly water-absorbing resin. When the water absorbtion factor is small the resulting composition is poor in water-absorbing property and water-swelling property, whereas when the water absorbtion factor is too large the highly water-absorbing resin swollen with water has diminished strength, which are both unfavorable.

From the viewpoint of the water absorbing property and the durability a water-swollen rubber layer, such highly water-absorbing resins are preferably as a cross-linked product of a polymer containing as a monomer component an $\alpha,\beta$-unsaturated compound having in the molecule one or two carboxyl groups or related groups from which a carboxyl group can be derived, such as carboxylic acid salts, carboxylic acid amide, carboxylic acid imide and carboxylic acid anhydride.

Examples of the above-mentioned $\alpha,\beta$-unsaturated compound include acrylic acid, methacrylic acid, acrylic amide, methacrylic amide, maleic anhydride, maleic acid, maleic acid amide, maleic acid imide, itaconic acid, crotonic acid, fumaric acid, and mesaconic acid. These compounds may also be used in combination with other copolymerizable monomer components within the limit which can give the properties required for the highly water-absorbing resin. Examples of the above-mentioned other copolymerizable monomers include $\alpha$-olefins, vinyl compounds and vinylidene compounds, such as ethylene, propylene, isobutylene, 1-butylene, disobutylene, methyl vinyl ether, styrene, vinyl acetate, acrylic esters, methacrylic esters and acrylonitrile. When used in combination with other monomers, the $\alpha,\beta$-unsaturated compound containing a carboxyl group or a group which can be converted thereto suitably occupies 40% by mole or more of the whole monomer component.

The polymer containing as the monomer component the $\alpha,\beta$-unsaturated compound having the carboxyl group or a group which can be converted thereto mentioned above can be prepared by conventional methods using a radical polymerization catalyst. The degree of polymerization of the polymer is not specifically limited, but is preferably from 10 to 3,000.

Among the above-mentioned polymers thus prepared, particularly preferable are polymers of acrylic acid, methacrylic acid or the like, and copolymers of an $\alpha$-olefin or vinyl compound with maleic anhydride. These polymers or copolymers are preferably rendered more hydrophilic by the reaction thereof with such compounds as the hydroxide, oxide, or carbonate of alkali metals or alkaline earth metals such as sodium, potassium, magnesium, calcium, and barium; ammonia, and amines. This reaction is carried out by dissolving the above-mentioned polymer in a solvent, preferably in water, and then adding to the solution the above-mentioned alkali metal compounds, alkaline earth metal compounds, ammonia, amines, etc. with stirring. Sodium hydroxide, potassium hydroxide, and ammonia are preferably used in this reaction from the viewpoint of their reactivity and the durability of high water absorbing capacity obtained.

The polymer containing an $\alpha,\beta$-unsaturated compound as a monomer component thus obtained is then subjected to a crosslinking reaction. Examples of the crosslinking agents used include polyfunctional epoxy compounds, polyacidic amines, polyhydric alcohols, aminoalcohols, polyisocyanates or polyfunctional halohydrines. Polyfunctional epoxy compounds and polyacidic amines are particularly preferably used. Examples of the polyfunctional epoxy compounds include glycerol diglycidyl ether, ethylene glycol diglycidyl ether, polyethylene glycol diglycidyl ether, glycerol triglycidyl ether, propylene glycol diglycidyl ether, polypropylene glycol diglycidyl ether, or trimethylolpropane triglycidyl ether. Examples of the polyacidic amines include ethylenediamine, diethylenetriamine, triethylenetetramine, tetraethylenepentamine, pentaethylene hexamine, and polyethyleneimine having a molecular weight of 5,000 or less. The crosslinking reaction is conducted by adding the above-mentioned crosslinking agent to the polymer containing as a monomer component the α,β-unsaturated compound mentioned above. The reaction may be conducted with application of heat and/or in the presence of solvent. When a polyfunctional epoxy compound or polyacidic amine is used as the crosslinking agent, the reaction is preferably conducted with application of heat and in the presence of water.

In such cases, the reaction mixture is preferably subjected to drying or heat treatment. The degree of crosslinking can be controlled by proper selection of the amount of crosslinking agent used so as to give a highly water-absorbing resin which shows the desired water absorption factor described above.

Preferred examples of the highly water-absorbing resin in this invention are enumerated below.

(1) The crosslinking product of a reaction product of a copolymer of maleic acid or its derivative, such as maleic anhydride, maleic acid amide and maleic acid imide, and a straight chain or branched chain α-olefin of 2 to 12, preferably 2 to 8, carbon atoms, such as ethylene, propylene, butylene, isobutylene and diisobutylene, with an alkali metal compound, alkaline earth metal compound, ammonia, amine and the like.

(2) The crosslinking product of a reaction product of a copolymer of maleic acid or its derivative and a vinyl or vinylidene compound, such as styrene, vinyl acetate, methyl vinyl ether, acrylic esters, methacrylic esters and acrylonitrile, with an alkali metal compound, alkaline earth metal compound, ammonia, amine, and the like.

(3) The crosslinking product of a reaction product of a polymer of acrylic or methacrylic acid with an alkali metal compound, alkaline earth metal compound, ammonia, amine, and the like.

(4) The crosslinking product of a reaction product of a copolymer of acrylic or methacrylic acid and a vinyl or vinylidene compound mentioned in (2) above with an alkali metal compound, alkaline earth metal compound, ammonia, amine, and the like.

Particularly preferable among these from the viewpoint of water absorbing property and durability are the crosslinking product of a reaction product of isobutylene-maleic anhydride copolymer with sodium hydroxide, potassium hydroxide, or ammonia; and the crosslinking product of a reaction product of polyacrylic acid with sodium hydroxide (namely, sodium polyacrylate).

The highly water-absorbing resin thus obtained is desirably used after pulverized into particles which can pass through a 20 mesh sieve.

In this invention, the proportions of the terminal-modified block copolymer of component (a) and the highly water-absorbing resin of component (b) in the composition are suitably selected such that a water absorption of 5 to 1,000% by weight, preferably 50 to 500% by weight, can be obtained. When the water absorption is less than 5% by weight, the water-absorbing property and the water-swelling property are poor, whereas when it exceeds 1,000% by weight the composition has a low strength when swollen by water, which are both unfavorable. The water absorption referred to herein is expressed by the equation Water absorption (% by weight) =

$$\frac{\text{Weight of composition after water absorption} - \text{Weight of composition before water absorption}}{\text{Weight of composition before water absorption}} \times 100.$$

To obtain a composition which shows such a water absorption, 5 to 300 parts by weight, preferably 10 to 200 parts by weight, of the highly water-absorbing resin of component (b) is generally compounded with 100 parts by weight of component (a).

The water absorbing composition according to this invention may be incorporated, as desired, with thermoplastic resins, elastomers, or the like which are different from components (a) and the softeners mentioned above, to improve processability, hardness, water-absorbing velocity and other properties.

The thermoplastic polymers, one of the components (b) used in this invention, include, for example, polystyrene-type resins such as polystyrene, high-impact rubber-modified styrene polymer, acrylonitrile-styrene copolymer, styrene-maleic anhydride copolymer, acrylonitrile-butadiene-styrene copolymer, and methacrylic ester-butadiene-styrene copolymer; polyethylene-type resins such as polyethylene, copolymers of ethylene and other monomers copolymerizable therewith which contain 50% or more of ethylene, for example ethylene-propylene copolymer, ethylene-vinyl acetate copolymer and its hydrolysis product, ethylene-acrylic acid ionomer, and chlorinated polyethylene; polypropylene-type resin such as polypropylene, copolymer of propylene and other monomers copolymerizable therewith which contain 50% or more propylene, for example propylene-ethylene copolymer, propylene-ethylacrylate copolymer and chlorinated polypropylene; polybutene-1 and polybutene-type resins which are copolymers of butene-1 and other monomers copolymerizable therewith; polyvinyl chloride, polyvinylidene chloride, polyvinyl chloride-type resins which are copolymers of vinyl chloride and/or vinylidene chloride and other monomers copolymerizable therewith and contain 50% or more of vinyl chloride and/or vinylidene chloride; polyvinyl acetate-type resins which are the copolymers of vinyl acetate and other copolymerizable monomers and contain 50% or more of vinyl acetate, and the hydrolysis product thereof; polymers of acrylic acid, its ester or its amide, polymers of methacrylic acid, its ester and its amide, and polyacrylate-type resins which are copolymers with other copolymerizable monomers, and contain 50% or more of these acrylic acid-type monomers; polymers of acrylonitrile and/or methacrylonitrile, polynitrile resins which are copolymers with other copolymerizable monomers and contain 50% or more of these acrylonitrile-type monomers; polyamide-type polymers, polyester-type polymers, polyphenylene ether-type polymers or grafted polyphenylene ether-type polymers formed by graft-polymerizing a vinylaromatic hydrocarbon or the like thereto, polyacetal-type polymers, polycarbonate-type polymers, polysulfone-type polymers, polyurethane-type polymers, polyallylate-type polymers, fluorine-type polymers, polyoxybenzoyl-type polymers and polyimide-type polymers.

Particularly preferable thermoplastic polymers are those which contain a functional group which is capable either of chemically combining with a polar group-containing atomic group present in the terminal-modified block copolymer or of exhibiting a strong interaction therewith (such polymers are hereinafter referred to as polar thermoplastic polymers). Examples thereof include a carboxyl group, thiocarboxyl group, dithiocarboxyl group, and the metal salt group thereof; an acid anhydride group, acid halide group, amino group, hydroxyl group, isocyanate group, thioisocyanate group, thiol group, ether group, thioether group, amido group, imido group, ester group, urethane group, ammonium salt group, and halogen.

Specific examples of polar thermoplastic polymers favorably used in this invention include the following.

(1) Aliphatic unsaturated carboxylic acid-containing polymer

The aliphatic unsaturated carboxylic acid-containing polymer used in this invention is a copolymer of an aliphatic unsaturated carboxylic acid and other copolymerizable monomers. Examples of the aliphatic unsaturated carboxylic acids include monocarboxylic acids such as acrylic acid and methacrylic acid; dicarboxylic acids such as fumaric acid, maleic acid, and itaconic acid; and dicarboxylic acid anhydrides such as maleic anhydride and itaconic anhydride. Examples of the other copolymerizable monomers include the above-mentioned vinylaromatic hydrocarbons such as styrene, α-methylstyrene, and p-methylstyrene; ester derivatives of the above-mentioned aliphatic unsaturated carboxylic acids with $C_1$–$C_{12}$ alcohols; amidated or imidated derivatives of aliphatic unsaturated carboxylic acids; nitrile-type monomers such as acrylonitrile and methacrylonitrile; vinyl acetate, vinyl chloride, and vinylidene chloride. The weight ratio of the aliphatic unsaturated carboxylic acids to the other copolymerizable monomers which can be favorably used is generally 1/99 to 50/50, preferably 3/97 to 40/60. Further, there can be used rubber-modified polymers obtained by copolymerizing the aliphatic unsaturated carboxylic acid and the other copolymerizable monomer in the presence of natural rubber, butadiene rubber, styrene-butadiene rubber, ethylene-propylene copolymer rubber, ethylene-propylene-diene monomer copolymer rubber and so forth.

As examples of particularly preferable aliphatic unsaturated carboxylic acid-containing polymers, mention may be made of a copolymer comprising 14 to 94% by weight of methyl methacrylates and 5 to 85% by weight of acrylic or methacrylic acids, and 1 to 70% by weight of a vinyl-aromatic hydrocarbon compound (weight average molecular weight: 50,000 to 500,000, preferably 70,000 to 200,000), a copolymer comprising 3 to 50% by weight of acrylic or methacrylic acids and 50 to 97% by weight of a vinyl-aromatic hydrocarbon compound (weight average molecular weight: 100,000 to 500,000, preferably 150,000 to 400,000), and a copolymer comprising 3 to 45% by weight of maleic anhydrides and 97 to 55% by weight of vinylaromatic hydrocarbon compounds (weight average molecular weight: 100,000 to 500,000, preferably 150,000 to 400,000).

(2) Polyamide-type polymer

The polyamide-type polymers used in this invention include polycondensation products of dicarboxylic acids and diamines, polycondensation products of α-aminocarboxylic acids, and ring opening polymerization products of cyclic lactams. As specific examples thereof, there may be mentioned nylon-46, nylon-6, nylon-66, nylon-610, nylon-11, and nylon-12, and the copolymers thereof, namely nylon-6-nylon-66 copolymer, nylon-6-nylon-12 copolymer and the like. These polyamides have preferably a number average molecular weight of 200 to 30,000 and a melting point of 150° to 270° C.

(3) Polyester-type polymer

The polyester-type polymers used in this invention are thermoplastic ones. The polyester-type polymer is a polymer which contains ester linkages in the molecule. Typical polyesters are those which have a structure formed by polycondensation of a dicarboxylic acid and a glycol. These polymers can be obtained by polycondensing a dicarboxylic acid, its lower ester, acid halide, or acid anhydride with a glycol. As examples of aromatic or aliphatic dicarboxylic acid which is used as the raw material of the polyester, there may be mentioned oxalic acid, maleic acid, succinic acid, glutaric acid, pimelic acid, suberic acid, adipic acid, sebacic acid, azelaic acid, 1,9-nonanedicarboxylic acid, 1,10-decanedicarboxylic acid, 1,16-hexadecanedicarboxylic acid, terphthalic acid, isophthalic acid, p,p'-dicarboxydiphenyl, phenyl, p-carboxyphenoxyacetic acid, and 2,6-naphthalenedicarboxylic acid. These acids may also be used in any desired combination thereof. Particularly preferable among these are terephthalic acid and isophthalic acid.

Glycols (or diols) which are the other raw material of the above-mentioned polyester are aliphatic or aromatic ones. Examples thereof include ethylene glycol, 1,3-propanediol, 1,2-propanediol, 1,4-butanediol, 1,6-hexanediol, 1,4-cyclohexanediol, 1,10-decanediol, neopentyl glycol, and p-xylene glycol. They can be used either alone or in any desired combination thereof. Among them, alkylene glycols of 2 to 10 carbon atoms are preferable, and ethylene glycol, 1,4-butanediol being particularly preferable. Among the polyesters comprising the dicarboxylic acids and the glycols mentioned above, particularly useful are polyethylene phthalate, polybutylene phthalate, and those wherein a part of their monomer units have been replaced with other monomer units.

The polyesters to be used have a molecular weight of 500 to 100,000, preferably 5,000 to 50,000.

The method of polymerization for the polyesters used in this invention is not specifically limited, and the polymerization can be conducted by conventional methods. One conventional method comprises subjecting the above-mentioned acid component, for example terephthalic acid, isophthalic acid, aliphatic dicarboxylic acid, or an ester-forming derivative thereof, with one or more or the above-mentioned glycols simultaneously or stepwise to direct esterification or transesterification, followed by polymerization. In this reaction, there may also be used any desired, conventionally used various catalysts, stabilizers, modifiers, additives, and the like.

As examples of other useful polyesters, mention may also be made of polylactones obtainable by ring opening polymerization of cyclic lactones such as pivalolactone, β-propiolactone, and ε-caprolactone.

In these polyester-type polymers, their molecular terminals are either a hydroxyl group or a carboxyl group. Further, in some polyesters, the molecular terminal has been treated with a monofunctional alcohol or monofunctional carboxylic acid to inactivate the functional group. In this invention, the polyestertype polymers used are preferably those in which a part or all of their molecular terminals have a functional group capable of reacting with the functional group of the modified block copolymer. Such functional group-containing polyesters will in part react with the modified block copolymer, whereby the compatibility of the resulting composition can be markedly improved.

The above-mentioned polyester-type polymers can be used alone and also in combinations of two or more thereof.

The thermoplastic polyester-type polymers referred to in this invention include, beside the polyesters used for fiber, film, resin, etc. such as polyethylene terephthalate, also low crystalline polyesters having a melting point lower than these, and polyetherester block polymers having a hard segment and a soft segment in the same molecule.

(4) Thermoplastic polyurethane-type polymer

The thermoplastic polyurethane-type polymers used in this invention are classified into those of a completely thermoplastic type and those of an incompletely thermoplastic type depending on the synthesis conditions thereof. These types are decided by the molar ratio of the OH group of the raw material bifunctional polyol or glycol to the NCO group of the diisocyanate. Those prepared at a molar ratio approximately satisfying the equation $0.95 < NCO/OH \leq 1$ are of a completely thermoplastic type and those prepared approximately at $1 < NCO/OH < 1.1$ are of an incompletely thermoplastic type. The above-mentioned thermoplastic polyurethanes include, for example, those which comprise blocks of polyol (polyester or polyether) and diisocyanate as the soft segments and blocks of diisocyanate and glycol as the hard segments.

Examples of the above-mentioned polyesterdiols of the raw material include poly(1,4-butylene adipate), poly(1,6-hexane adipate) and polycaprolactone. Examples of polyetherdiols include polyethylene glycol, polypropylene glycol, and polyoxytetramethylene glycol. Examples of the glycols include ethylene glycol, 1,4-butanediol and 1,6-hexanediol. The diisocyanates include those of aromatic, alicyclic and aliphatic type, which include, for example, tolylene diisocyanate, 4,4'-diphenylmethane diisocyanate, hexamethylene diisocyanate, and isophorone diisocyanate.

Beside the thermoplastic polyurethane elastomers shown above, other polyurethane-type polymers used for adhesive, foam, and coating may also be used in the composition of this invention so long as they are sufficiently compatible with the modified block copolymers of components (b) of this invention.

Thermoplastic polyurethanes which can be favorably used have a molecular weight of 5,000 to 500,000, preferably 10,000 to 300,000, from the viewpoint of mechanical properties.

(5) Vinyl alcohol-type polymer

The vinyl alcohol-type polymers referred to herein are polymers comprising vinyl alcohols or copolymers containing vinyl alcohols, and are obtained by partial or complete saponification of vinyl ester-type polymers with alkalis. Ethylene-vinyl alcohol copolymer uses as the starting material a corresponding ethylene-vinyl acetate copolymer, which has generally a vinyl acetate content of 0.5 to 80% by mole. In the above-mentioned polymer, 10 to 100% by mole of the vinyl acetates are saponified to form the ethylene-vinyl alcohol copolymer. In this invention, although a variety of polyvinyl alcohol and olefin-vinyl alcohol copolymer may be used, ethylene-vinyl alcohol copolymer is preferable from the viewpoint of processability and mechanical properties.

(6) Polyoxymethylene-type polymer

As examples of polyoxymethylene-type polymers, there may be mentioned homopolymers prepared by polymerization of formaldehyde or trioxane, or copolymers mainly comprising the monomers. In the homopolymers, it is common to convert the terminal group of the polymer into an ester or ether group to improve their thermal resistance and chemical resistance. As to copolymers, there may be mentioned copolymers of formaldehyde or trioxane with other aldehyde, cyclic ether, cyclic carbonate, epoxide, isocyanate, vinyl compounds, and the like.

(7) Polycarbonate-type polymer

The polycarbonate-type polymer is an aromatic polycarbonate having the structural unit of the general formula

or

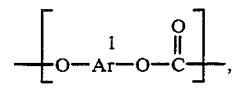

wherein $Ar^1$ denotes a phenylene group unsubstituted or substituted with an alkyl group, substituted alkyl group, alkoxy group, halogen, or nitro group; and A denotes an alkylene group, alkylidene group, cycloalkylene group, cycloalkylidene group, sulfur, oxygen, sulfoxide group, or sulfo group. As a preferred example, mention may be made of poly-4,4'-dioxydiphenyl-2,2'-propane carbonate.

(8) The polysulfone-type polymer is a thermoplastic polysulfone having the structural unit of the general formula

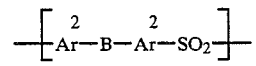

or

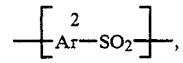

wherein $Ar^2$ denotes a phenylene group and B denotes oxygen, sulfur, or an aromatic diol rest. As preferred examples, mention may be made of poly(ether sulfone) and poly(4,4-bisphenol ether sulfone).

(9) Polyphenylene ether-type polymer

The polyphenylene ether-type polymer is a phenylene ether polymer having the structural unit of the general formula

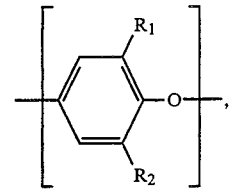

wherein $R_1$ and $R_2$ denote a $C_1$–$C_4$ alkyl group, a substituted alkyl group or halogen, or a polyphenylene ether graft copolymer obtained by graft-polymerizing a styrene compound to the phenylene ether polymer. Examples of the styrene compounds used for the graft-modification include styrene, α-methylstyrene, methylstyrene, tert-butylstyrene, and chlorostyrene. Two or more of these compounds may be used together in the graft polymerization. Also, they may be used, if necessary, together with other copolymerizable vinyl compounds, such as acrylic esters, methacrylic esters, acrylonitrile, and methacrylonitrile, to effect cograft-polymerization. A preferred example of the phenylene ether polymer is poly(2,6-dimethyl-1,4-phenylene) ether; a preferred example of grafted products thereof is the styrene-graft copolymer of the polymer.

(10) Polyarylene sulfide-type polymer

The polyarylene sulfide-type polymer is an arylene sulfide polymer or copolymer having the structural unit of the formula

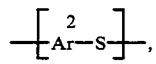

wherein $Ar^3$ denotes a phenylene group unsubstituted or substituted with an alkyl or substituted alkyl group. Preferred examples include polyphenylene sulfide and poly-4,4'-diphenylene sulfide.

(11) Polyvinyl chloride-type polymer

The polyvinyl chloride-type polymers include such polymers as polyvinyl chloride, polyvinylidene chloride; copolymers of vinyl chloride and/or vinylidene chloride with other monomers copolymerizable therewith which contain vinyl chloride and/or vinylidene chloride, such as vinyl chloride-vinylidene chloride copolymer, vinyl chloride-vinyl acetate copolymer, vinyl chlorideethylene copolymer, vinyl chloride-acrylic ester copolymer, and vinyl chloride-maleic ester copolymer; graft copolymers based on these polymers and copolymers; and chlorinated polyolefins such as chlorinated polyethylene and chlorinated polypropylene.

The above-mentioned preferable polar thermoplastic polymers may also be used in combinations of two or more thereof in this invention.

The above-mentioned polar thermoplastic polymer may be used in combination with, beside the aforesaid polystyrene-type polymer, polyethylene-type polymer, polypropylene-type polymer, polybutylene-type polymer and polyvinyl chloride-type polymer, and also polyvinyl ester-type polymer, polyacrylate-type polymer, polyacrylonitrile-type polymer and the like.

A particularly preferable combination of component (a) and the thermoplastic resin of component (b) is obtained when the functional group present in the rest of the terminal-treating agent of component (a) and the functional group present in at least one thermoplastic polymer used as component (b) form a chemical linkage, such as an amide linkage, imide linkage and quaternary ammonium salt linkage, to produce a graft polymer. The formation of such linkages can be attained by selecting from the terminal-modified block copolymers of component (a) and the thermoplastic polymers of component (b) mentioned above, mutually and as desired those which have a functional group capable of forming the above-mentioned linkage.

The composition of this invention varies in its mechanical properties widely from rubber-like or leather-like to resinous in accordance with the compounding ratio of the terminal-modified block copolymer to the thermoplastic polymer.

For example, when the compounding ratio is such that the terminal-modified block copolymer is present in a larger amount, the composition of this invention is a rubber-like to leather-like polymer composition which is excellent in hardness, tensile strength, oil resistance, thermal resistance, etc. as compared with styrene-butadiene or styrene-olefin block copolymer of the prior art.

As the proportion of the polar thermoplastic resin component increases, the composition changes into a tough resinous material. At a compounding ratio where the polar thermoplastic resin component is contained in larger amount, the composition shows markedly improved impact resistance, adhesive property, flex resistance, etc. though in varied degrees depending on the kind of the polar thermoplastic resin used.

In the composition of this invention, its composition is in the range of 98 to 2 parts by weight of the terminal-modified block copolymer of component (a) and 2 to 98 parts by weight of the thermoplastic polymer of component (b), 5 to 95 parts by weight being preferable for the terminal-modified block copolymer. Outside the above-mentioned range, the composition exhibits no marked difference in characteristic properties as compared with the individual polymers themselves.

Further, in the range of 98 to 50 parts by weight of the terminal-modified block copolymer and 2 to 50 parts by weight of the thermoplastic polymer, the composition is useful as a modified composition of the terminal-modified block copolymer; whereas in the range of 2 to 50 parts by weight of the terminal-modified block copolymer and 98 to 50 parts by weight of the thermoplastic polymer, it is useful as a modified (particularly, of improved impact resistance etc.) composition of the thermoplastic polymer.

The scope of this invention includes also a case where a graft copolymer comprising the terminal-modified block copolymer and the thermoplastic polymer, formed by the reaction between the reactive group contained in the terminal-modified block copolymer and the reactive group contained in the thermoplastic polymer, is contained as part of the present composition.

The electroconductive substance, one of the components (b) used in this invention, may be electroconductive powders, flakes, electroconductive fibers etc. which are in themselves electroconductive. Specific examples thereof include carbon black such as Ketjen Black, channel black, furnace black, thermal black and acetylene black; graphite, copper powder, brass powder, bronze powder, iron powder, zinc powder, nickel powder, stainless steel powder, aluminum powder, tin oxide powder, silver powder, palladium powder, alloy powder, or electroconductive metal deposition powder exemplified by powders obtained by vapor-depositing silver, nickel, etc. onto the surface of metal or inorganic substances; flakes exemplified by nickel flake, aluminum flake and stainless steel flake; metal ribbons exemplified by aluminum ribbon, iron ribbon, and nickel ribbon; carbon fiber and fibers of metals such as copper, brass, bronze, iron, aluminum, and stainless steel; electroconductive metal-coated glass fibers such as nickel-coated glass fiber and aluminum-coated glass fiber; electroconductive metal-coated fibrous material exemplified by nickel-coated carbon fiber, metal whisker, etc.; and further, metallized glass beads, metallized mica, and metal oxide. Among the above-mentioned substances, powdery ones have preferably a particle diameter of 200 μm or less, and fibrous ones have preferably a diameter of 100 μm or less and a length of 10 mm or less, more preferably 1 to 5 mm. In the present invention, the electroconductive substance of component (b) is used generally in the range of 3 to 100 parts by weight, preferably 5 to 50 parts by weight, relative to 100 parts by weight of the terminal-modified block copolymer of component (a). When the compounded amount of the electroconductive material is less than 3 parts by weight the resulting composition is poor in electroconductivity, whereas when it exceeds 100 parts by weight the composition has not only poor mechanical strength but low flowability, causing difficulty in fabrication, which are both unfavorable.

The present composition may be incorporated, if necessary, with softeners and with thermoplastic resin, elastomers, etc. which are different from the component (a), to improve processability, hardness and other properties.

As to the terminal-modified block copolymer used in this invention in adhesive compositions, water-absorbing compositions, thermoplastic resin compositions and electroconductive compositions, it is most preferable to use the polymers which have the rest of the amino group-or imino group-containing terminal-treating agent stipulated for in this invention bonded to the molecular terminal. However, if necessary, it is also possible to use a terminal-modified block copolymer obtained by the reaction of at least one terminal-treating agent selected from compounds which contain at least one kind of functional group represented by the following general formulas and contain no tertiary amino group,

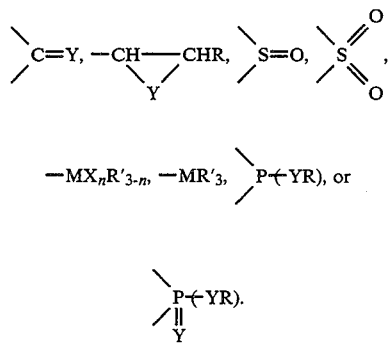

Such terminal-treating agents include, for example, alkylene oxide, alkylene sulfide, aldehyde compounds, ketone compounds, thioketone compounds, ester compounds, pyridine derivatives, sulfonic acid ester compounds, phosphorus-containing compounds, silicon compounds, and tin compounds.

As specific examples thereof, there may be mentioned the following compounds.

Examples of alkylene oxide include ethylene oxide, propylene oxide, butadiene oxide, butene oxide, cyclohexene oxide, vinylcyclohexene oxide, styrene oxide, allyl glycidyl ether, epichlorohydrin, epibromohydrin, epoxidized hydrocarbon polymer such as epoxidized polybutadiene, and epoxidized vegetable oil such as epoxidized soybean oil and epoxidized linseed oil. Examples of alkylene sulfide are compounds corresponding to above-mentioned alkylene oxide, such as ethylene sulfide, propylene sulfide, and butadiene sulfide.

Examples of the aldehyde compounds include acetaldehyde, propionaldehyde, isobutyrylaldehyde, n-caproaldehyde, acetothioaldehyde, propionthioaldehyde, isobutyrylthioaldehyde, n-caprothioaldehyde, valearaldehyde, benzaldehyde, decanal, eicosanal, 2-phenylbutanal, 3-methylbenzaldehyde, 4-cyclohexylbenzaldehyde, cyclohexanecarboxyaldehyde, 3-phenylcyclohexanecarboxyaldehyde, and further 1,4,7-naphthenetricarboxylaldehyde, 1,7,9-anthracenetricarboxyaldehyde, 1,1,5-pentanetricarboxyaldehyde and analogous polyaldehyde-containing aliphatic and aromatic compounds.

Examples of the ketone compounds and thioketone compounds include acetone, methyl ethyl ketone, diethyl ketone, methyl propyl ketone, isopropyl methyl ketone, dipropyl ketone, acetophenone, and benzophenone. Examples of the esters having a carboxylic acid ester group are esters of monobasic acids, such as acetic acid, butyric acid, caproic acid, lauric acid, palmitic acid, stearic acid, cyclohexylpropionic acid, cyclohexylcaproic acid, benzoic acid, and phenylbutyric acid, and dibasic acids, such as oxalic acid, maleic acid, malonic acid, fumaric acid, succinic acid, glutaric acid, adipic acid, pimelic acid, suberic acid, sebacic acid, itaconic acid, phthalic acid, isophthalic acid, terephthalic acid, naphthalic acid and diphenic acid, with alcohols such as methyl alcohol, ethyl alcohol, n-propyl alcohol, isopropyl alcohol, n-butyl alcohol, sec-butyl alcohol, tert-butyl alcohol, amyl alcohol, hexyl alcohol, octyl alcohol, phenol and cresol. Examples of the lactones include α-propiolactone, δ-valerolactone, ε-caprolactone, and lactones which correspond to the following acids: 2-methyl-3-hydroxypropionic acid, 3-hydroxynonanone or 3-hydroxypelargonic acid, 2-dodecyl-3-hydroxypropionic acid, 2-cyclopentyl-3-hydroxypropionic acid, 3-phenyl-3-hydroxypropionic acid, 2-naphthyl-3-hydroxypropionic acid, 2-n-butyl-3-cyclohexyl-3-hydroxypropionic 2-phenyl-3-hydroxytridecanoic acid, 2-(2-methylcyclopentyl)-3-hydroxypropionic acid, 2-methylphenyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-(4-cyclohexylbenzyl)-5-hydroxyvaleric acid, benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 7-phenyl-6-hydroxy-6-octoenoic acid, 2,2-di(1-cyclohexenyl)-5-hydroxy-5-heptenoic acid, 2,2-dipropenyl-5-hydroxy-5-heptenoic acid, and 2,2-dimethyl-4-propenyl-3-hydroxy-3,5-heptadienoic acid.

Examples of the pyridine derivatives include 2-vinylpyridine, 4-vinylpyridine, 4-benzoylpyridine, 2-acetylpyridine, and 4-pyridinecarboxylic acid methyl ester. Examples of the sulfonic acid esters include esters of benzenesulfonic acid, toluenesulfonic acid, anthraquinonesulfonic acid, N,N-dimethylaminobenzenesulfonic acid, N,N-dimethyltoluidinesulfonic acid etc. with an alcohol.

Examples of the phosphorus-containing compound include trialkyl or triaryl phosphites represented by $(RO)_3P$, trialkyl or triaryl phosphates represented by $(RO)_3P \rightarrow O$, trialkyl or triaryl phosphites represented by $(RS)_3P$, and trialkyl or triaryl thiophosphates represented by $(RO)_3P \rightarrow S$, wherein R denotes, for example, an alkyl group such as methyl, ethyl, butyl, hexyl, 2-ethylhexyl, cyclohexyl, nonyl, decyl, lauryl, tridecyl, and stearyl; phenyl group, or phenyl group substituted with the above mentioned alkyl groups.

Examples of the silicon-containing compounds include halogenated silanes such as tetrachlorosilane, tetrabromosilane, trichloromethylsilane, dichlorodimethylsilane, and dichlorodiphenylsilane; and further, compounds containing hydrolyzable organic groups other than halogens, such as tetraethoxysilane, triethoxymonochlorosilane, diethoxymonochloromonomethylsilane, triethoxymonomethylsilane, trimethoxymonomethylsilane, diethoxydimethylsilane, dimethoxydimethylsilane, dimethyldiacetoxysilane, methyltriacetoxysilane, chloromethyltriethoxysilane, and 3-chloropropyltriethoxysilane.

Examples of the tin-containing compounds include tin tetrachloride, monobutyltin trichloride, tetramethoxytin, trimethyltin chloride, tributyltin chloride, trioctyltin chloride, tributyltin bromide, dibutyltin dichloride, dioctyltin dichloride, phenyltributyltin, methoxytributyltin, benzyltributyltin, diphenyldibutyltin, dimethoxydibutyltin, dibenzyldibutyltin, phenoxytributyltin, diphenoxydibutyltin, tricyclohexyltin chloride, dicyclohexyltin dichloride, and tridodecyltin chloride.

The terminal-modified block copolymer modified by above-mentioned compounds may also be used as a mixture thereof with the amino group- or imino group- containing terminal-modified block copolymer stipulated for in this invention, in which case the compounding ratio by weight is 1:99 to 99:1, preferably 3:97 to 97:3.

The present composition can be produced by means of conventional apparatuses used in mixing usual high molecular substances. Usuable methods include the melt-blending method using a conventional blender such as an open roll, intensive mixer, internal mixer, Ko-kneader, continuous twin-rotor kneader, and single or twin-screw extruder; and a method which comprises dispersing the component (b) into a solution containing the component (a) dissolved therein and then heating the resulting mixture to remove the solvent.

The present composition may also be incorporated, within the limits not deleterious to its property, with reinforcements or fillers, such as calcium carbonate, silica, carbon black, glass fiber, and clay, and plasticizers such as process oil, polyethylene glycol, and phthalic esters.

Other additives, such as thermal stabilizers, antioxidants, ultraviolet absorbers, colorants, and pigments, may also be added to the composition. Further, the present composition may be incorporated with foaming agents to form expanded materials. Specifically, those additives may be used which are described in "Purasuchikku oyobi Gomu-yo Tenkazai Binran (Practical Handbook of Additives for Plastics and Rubber )", published by Kagaku Kogyo-sha, and in "Gomu.-Purasuchikku Haigo Yakuhin (Chemicals for Plastics and Rubber Compounds)", published by Rubber Digest Co.

INDUSTRIAL APPLICABILITY

The adhesive composition of this invention can be used for various kinds of pressure sensitive adhesive tapes and labels, pressure sensitive thin plates, pressure sensitive sheets, back adhesive for fixing various lightweight plastic molded articles, back adhesive for fixing carpets, and back adhesive for fixing tiles, and other uses. It is particularly useful for hot melt pressure sensitive adhesive tapes and labels. Further, the adhesive composition of this invention can also be used as adhesives for plastics, rubber-like substances, expanded materials, metals, wood, and paper products.

The water-absorbing composition of this invention can be utilized in various ways by virtue of its excellent water-absorbing property, water-swelling property, water-holding property, and mechanical strength including tensile strength and impact resistance. For example, it can be favorably used for sealing materials, packing materials, water-stopping materials, various kinds of water-proof materials, water-holding agents, oil separating materials, sludge-solidifying materials, dew condensation-preventing materials, medical supplies such as sweat-absorbing material, sanitary goods and diapers, and low temperature heat storage materials.

The composition of this invention which comprises the terminal-modified block copolymer and thermoplastic resin is extremely excellent in compatibility and hence is homogeneous. Accordingly, it has extremely excellent mechanical properties as compared with prior art mixtures of different kinds of polymers. It is specifically used, by virtue of such characteristics, as a material for machine parts, automobile parts, electrical parts, toys, industrial parts, belts, hoses, footwear, medical supplies, vibration proof rubber, daily necessaries, sundry goods, building materials, sheets, film, blow-molded articles, adhesives and pressure sensitive adhesives of solution or hot melt type, and the adhesive layer of laminates.

The electroconductive composition of this invention can be utilized in various ways in which electroconductivity is required by virtue of its excellent mechanical properties including tensile strength and impact resistance and electroconductivity. For example, when the compounded amount of electroconductive material is small and hence the resulting composition has an electroconductivity of a relatively low level, it can be used for medical rubber goods, nurse shoes, and antistatic carpets, ruggs, flooring, conveyor belts, rolls, and hoses, as an antistatic material; when the compounded amount of electroconductive material is large and hence the resulting composition has an electroconductivity of a relatively high level, it can be used for parts of office automation appliances, portable electronic calculators, and toys, and electromagnetic interference materials, as an electroconductive material.

EXAMPLE

Although some working examples are described below, they are merely representative of this invention and in no way limit the scope of this invention.

The block copolymers used in the following Examples which comprise conjugated dienes and vinylaromatic hydrocarbon compounds and contain an alkali metal at the terminal were prepared in the following manners.

Block Copolymer (A)

Under a nitrogen gas atmosphere, 0.11 parts by weight of n-butyllithium was added to an n-hexane solution containing 15 parts by weight of 1,3-butadiene and 20 parts by weight of styrene, and the mixture was polymerized at 70° C. for 2 hours; then, an n-hexane solution containing 45 parts by weight of 1,3-butadiene and 20 parts by weight of styrene was added thereto, and the resulting mixture was polymerized at 70° C. for 2 hours. The polymer thus obtained was a block copolymer of B-A-B-A structure which had a styrene content of 40% by weight and contained lithium bonded to one terminal of the molecule.

Block Copolymer (B)

Under a nitrogen gas atmosphere, 0.1 parts by weight of n-butyllithium was added to a cyclohexane solution containing 14 parts by weight of styrene, and the mixture was polymerized at 70° C. for 1 hour; then a cyclohexane solution containing 72 parts by weight of 1,3-butadiene was added thereto, and the resulting mixture was polymerized at 70° C. for 2 hours. Thereafter, a cyclohexane solution containing 14 parts by weight of styrene was further added, and the mixture was polymerized at 70° C. for 1 hour. The polymer thus obtained was a block copolymer of A-B-A structure which had a styrene content of 28% by weight and contained lithium bonded to one terminal of the molecule.

Block Copolymer (C)

Under a nitrogen gas atmosphere, 0.08 parts by weight of n-butyllithium was added to a cyclohexane solution containing 7.5 parts by weight of styrene, the resulting mixture was polymerized at 70° C. for 1 hour, then a cyclohexane solution containing 84 parts by weight of isoprene was added thereto, and the mixture was polymerized at 70° C. for 2 hours. Thereafter, a cyclohexane solution containing 7.5 parts by weight was further added, and the resulting mixture was polymerized at 70° C. for 1 hour, then a cyclohexane solution containing 1 part by weight of isoprene was added thereto, and the mixture was polymerized for 30 minutes. The polymer thus obtained was a block copolymer having a styrene content of 15% by weight and a substantially A-B-A structure.

Block Copolymer (D)

Under a nitrogen gas atmosphere, 0.07 parts by weight of n-butyllithium was added to a cyclohexane solution containing 20 parts by weight of styrene, the resulting mixture was polymerized at 70° C. for 1 hour, then a cyclohexane solution containing 60 parts by weight of 1,3-butadiene was added thereto, and the mixture was polymerized at 70° C. for 2 hours. Thereafter, a cyclohexane solution containing 20 parts by weight of styrene was further added, and the resulting mixture was polymerized at 70° C. for 1 hour. The polymer thus obtained was a block copolymer of A-B-A structure which had a styrene content of 40% by weight and contained lithium bonded to one terminal of the molecule.

Block Copolymer (E)

Under a nitrogen gas atmosphere, isoprenyidilithium was added to a cyclohexane solution containing 65 parts by weight of 1,3-butadiene and 30 parts by weight of styrene, and the resulting mixture was polymerized at 70° C. for 2 hours. Thereafter, a cyclohexane solution containing 5 parts by weight of 1,3-butadiene was added thereto, and the resulting mixture was polymerized at 70° C. for 1 hour. The polymer thus obtained was a block copolymer of B-A-B-A-B structure which had a number average molecular weight of about 80,000, a styrene content of 30% by weight and contained lithium bonded to both terminals of the molecule.

Block Copolymer (F)

Under a nitrogen gas atmosphere, 0.09 parts by weight of n-butyllithium was added to a cyclohexane solution containing 15 parts by weight of styrene, the resulting mixture was polymerized at 70° C. for 1 hour, then a cyclohexane solution containing 70 parts by weight cf 1,3-butadiene was added thereto, and the mixture was polymerized at 70° C. for 2 hours. Thereafter, a cyciohexane solution containing 15 parts by weight of styrene was added thereto, and the resulting mixture was poiymerized at 70° C. for 1 hour. The polymer thus obtained was a block copolymer of A-B-A structure which had a styrene content of 30% by weight and contained lithium bonded to one terminal of the molecule.

Block Copolymer (G)

Under a nitrogen gas atmosphere, 0.12 parts by weight of n-butyllithium was added to a cyclohexane solution containing 7.5 parts by weight of styrene, the resulting mixture was polymerized at 70° C. for 1 hour, then a cyclohexane solution containing 85 parts by weight of isoprene was added thereto, and the mixture was polymerized at 70° C. for 2 hours. Thereafter, a cyclohexane solution containing 7.5 parts by weight of styrene was further added thereto, and the mixture was polymerized at 70° C. for 1 hour. The polymer thus obtained was a copolymer of A-B-A structure which had a styrene content of 15% by weight and contained lithium bonded to one terminal of the molecule.

Block Copolymer (H)

Under a nitrogen gas atmosphere, 0.08 parts by weight of n-butyllithium was added to a cyclohexane solution containing 30 parts by weight of styrene and 0.3 parts by weight of tetrahydrofuran, the resulting mixture was polymerized at 70° C. for 1 hour, then a cyclohexane solution containing 20 parts by weight of 1,3-butadiene and 50 parts by weight of styrene was further added thereto, and the mixture was polymerized at 70° C. for 2 hours. The polymer thus obtained was a block copolymer of A-B-A structure which had a styrene content of 80% by weight and contained lithium bonded to one terminal of the molecule.

Block Copolymer (I)

Under a nitrogen gas atmosphere, 0.08 parts by weight of n-butyllithium was added to a cyclohexane solution containing 30 parts by weight of styrene and 0.3 parts by weight of tetrahydrofuran, the resulting mixture was polymerized at 70° C. for 1 hour, then a cyciohexane solution containing 10 parts by weight of 1,3-butadiene and 10 parts by weight of styrene was added thereto, the mixture was polymerized at 70° C. for 1 hour, then a cyclohexane solution containing 10 parts by weight of 1,3-butadiene and 10 parts by weight of styrene was further added thereto, and the mixture was polymerized at 70° C. for 1 hour. Thereafter, a cyclohexane solution containing 30 parts by weight of styrene was added thereto, and the mixture was polymerized at 70° C. for 1 hour. The polymer thus obtained was a block copolymer of A-B-A structure which had a styrene content of 80% by weight and contained lithium bonded to one terminal of the molecule.

EXAMPLES 1 TO 28 AND COMPARABLE EXAMPLES 1 TO 3

In accordance with Tables 1 to 3, terminal-modified block copolymers were prepared by reacting a variety of terminal-treating agents with the block copolymers containing lithium bonded to the terminal of the polymer in a proportion of one molecule of the agents relative to one lithium atom of the polymerization initiator used in polymerizing the block copolymer, at 70° C. for 30 minutes, After the reaction with a terminal-treating agent, the reaction liquid was neutralized by addition of dilute aqueous hydrochloric acid, then 2,6-di-tert-butyl-4-methylphenol and tri(nonylphenyl)phosphite were added as a stabilizer to the reaction mixture respectively in an amount of 0.5 part by weight relative to 100 parts by weight of the block copolymer, and then the mixture was heated to distill the solvent away.

Then, 100 parts by weight of the terminal-modified block copolymer, 100 parts by weight of an aromatic modified terpene-type resin (YS resin, TO-105, a registered trade mark, mfd. by Yasuhara Yushi), 30 parts by weight of naphthene-type oil, and 1 part by weight of Nocrac NS-7 (a registered trade mark, mfd. by Ouchi Shinko Kagaku ) used as a stabilizer were melt-blended at 180° C. to prepare a hot melt adhesive composition.

The adhesive compositions thus prepared were respectively applied to back-treated kraft paper to obtain pressure sensitive adhesive kraft tapes.

The pressure sensitive adhesive kraft tape was measured for its tack (initial tackiness), peeling strength, and creep resistance characteristic for stainless steel. These measurements were respectively conducted by the following methods.

The tack was evaluated by fixing the pressure sensitive adhesive tape on a plate placed at an angle of inclination of 30°, and then determining the number of the ball (Ball No.) which stopped on the surface of the pressure sensitive adhesive tape according to the ball-rolling method of J. Dow. The evaluation of tack was conducted at 23° C. The peeling strength was determined by adhering the pressure sensitive adhesive tape with a stainless steel plate so as to give an adhesion area of 25 mm × 100 mm, and then peeling the tape off at 23° C. at a peeling rate of 300 mm/min. (180° peeling).

The creep resistance characteristic was evaluated by adhering the pressure sensitive adhesive tape with a stainless steel plate to give an adhesion area of 25 mm × 25 mm, fixing the stainless steel plate, then applying a load of 1 kg to the lower adhesive tape, and measuring the time required for the adhesive tape to peel off completely at an ambient temperature of 60° C.

The results thus obtained are shown in Tables 1 to 3, from which it can be seen that the present adhesive composition comprising the terminal-modified block copolymer compounded therein is excellent in creep resistance and is suitable as a hot melt pressure sensitive adhesive.

TABLE 1

| | Kind of copolymer | Terminal-treating agent | Tack (Ball No.) | Peeling strength (g/10 mm) | Creep characteristic (min) |
|---|---|---|---|---|---|
| Example | | | | | |
| 1 | Block copolymer (A) | 1,3-Dimethyl-2-imidazolidinone | 12 | 970 | 200 |
| 2 | | 4-Methoxybenzylidene-4-butylaniline | 13 | 980 | 195 |
| 3 | | Diphenylcyanamide | 13 | 1100 | 190 |
| 4 | | Tri(2-methyl-1-aziridinyl)phenylphosphine oxide | 13 | 1000 | 220 |
| 5 | | N,N,N',N'-Tetramethylurea | 12 | 950 | 155 |
| 6 | | 3,7-Bis(dimethylamino)-10-benzoylphenothiazine | 12 | 960 | 160 |
| 7 | | Tetraglycidyl-1,3-bis-aminomethylcyclohexane | 12 | 1000 | 185 |
| 8 | | Propanesultone | 11 | 1100 | 135 |
| Comparative Example 1 | | Methanol | 10 | 950 | 120 |

TABLE 2

| | Kind of copolymer | Terminal-treating agent | Tack (Ball No.) | Peeling strength (g/10 mm) | Creep characteristic (min) |
|---|---|---|---|---|---|
| Example | | | | | |
| 9 | Block copolymer (B) | 1,3-Dimethyl-2-imidazolidinone | 24 | 850 | 130 |
| 10 | | N,N'-Dimethylpropyleneurea | 24 | 820 | 115 |
| 11 | | N-Methylpyrrolidone | 25 | 880 | 120 |
| 12 | | N,N'-Dicyclohexylcarbodiimide | 25 | 860 | 140 |
| 13 | | Anisalaniline | 24 | 840 | 135 |
| 14 | | N-Methyl-ε-caprolactam | 24 | 780 | 105 |
| 15 | | 4,4'-Bis(diethylamino)-benzophenone | 23 | 800 | 100 |
| 16 | | 4,4'-Bis(diethylamino)- | 23 | 800 | 95 |

TABLE 2-continued

| | Kind of copolymer | Terminal-treating agent | Tack (Ball No.) | Peeling strength (g/10 mm) | Creep characteristic (min) |
|---|---|---|---|---|---|
| | | thiobenzophenone | | | |
| Example | | | | | |
| 17 | Block | Diethylaminoethylstyrene | 22 | 790 | 105 |
| 18 | copolymer | N,N-Dimethylformaldehyde | 23 | 780 | 83 |
| 19 | (B) | N,N-Dimethylnicotinamide | 23 | 810 | 90 |
| 20 | | N,N,N',N'-Tetramethyl-thiourea | 23 | 800 | 95 |
| 21 | | Epoxydized soybean oil | 24 | 830 | 110 |
| 22 | | Ethylene oxide | 22 | 760 | 80 |
| 23 | | Benzaldehyde | 23 | 770 | 85 |
| 24 | | Tributylchlorotin | 22 | 750 | 80 |
| 25 | | Tetraethoxysilane | 22 | 800 | 115 |
| 26 | | $\epsilon$-Caprolactone | 23 | 760 | 80 |
| Comparative Example 2 | | Methanol | 22 | 750 | 70 |

TABLE 3

| | Kind of copolymer | Terminal-treating agent | Tack (Ball No.) | Peeling strength (g/10 mm) | Creep characteristic (min) |
|---|---|---|---|---|---|
| Example | | | | | |
| 27 | Block copolymer | 1,3-Dimethyl-2-imidazolidinone | 32 | 650 | 60 |
| 28 | (C) | Tetraglycidyl-m-xylene-diamine | 32 | 700 | 50 |
| Comparative Example 3 | | Methanol | 31 | 620 | 30 |

EXAMPLES 29 TO 33

Adhesive compositions were prepared in the same manner as in Example 9 except that tackifier resins shown in Table 4 were used, and their properties as the material for hot melt pressure sensitive adhesive tapes were examined. The results obtained are shown in Table 4. Creep resistance characteristic was evaluated in each Example by comparison with the property of the composition of the same composition, taken as the standard, which was prepared by using as the block copolymer the polymer of Comparative Example 2 described above.

TABLE 4

| | Tackifier resin | | Tack (Ball No.) | Peeling strength (g/10 mm) | Creep characteristic*[1] (min) |
|---|---|---|---|---|---|
| | Trade name | Constituent | | | |
| Example | | | | | |
| 29 | Arkon M-90 (mfd. by Arakawa Kagaku) | Alicyclic-type saturated hydrocarbon resin | 18 | 760 | ⊚ |
| 30 | Super Ester A-100 (mfd. by Arakawa Kagaku) | Disproportionated rosin ester | 26 | 850 | ⊚ |
| 31 | Foral 85 (mfd. by Hercules) | Completely hydrogenated rosin ester | 21 | 700 | ⊚ |
| 32 | ECR 316 (mfd. by Exxon Chemical) | Modified aliphatic-type petroleum resin | 20 | 890 | ⊚ |
| 33 | Quintone U-185 (mfd. by Nippon Zeon) | Aliphatic-type hydrocarbon resin | 15 | 860 | ⊚ |

Note:
*[1]The terminal-modifying effect on creep resistance characteristic was judged on the basis of the peeling time of a pressure sensitive adhesive tape (standard sample) using a block copolymer having a hydrogen atom bonded to the polymer terminal (which contains no terminal-treating agent remainder containing the atom stipulated for in this invention bonded to the polymer terminal) obtained by treating a block copolymer containing an alkali metal at the polymer terminal with methanol.
⊚: Peeling time exceeds 1.5 times the peeling time of the standard sample.
○: Peeling time exceeds 1.2 times the peeling time of the standard sample and is not more than 1.5 times.
△: Peeling time exceeds 1.0 times the peeling time of the standard sample and is not more than 1.2 times.
X: Peeling time is not more than 1.0 times the peeling time of the standard sample.

Example 34 and Comparative Example 4

An adhesive composition was prepared by compounding 100 parts by weight of the same terminal-modified block copolymer as that used in Example 7, 60 parts by weight of YS Resin A-1150 (a registered trade mark), 15 parts by weight of an ethylene-vinyl acetate copolymer, 50 parts by weight of paraffin wax, and 3 parts by weight of a stabilizer, Nocrac NS-7 (a registered trade mark), and its adhesive property for an aluminum plate, canvas, and polyethylene was examined. A similar adhesive composition was prepared as a Comparative Example by using the same block copolymer as that used in Comparative Example 1 mentioned before in place of the terminal-modified block copolymer.

Adhesion to the above-mentioned materials to be adhered was effected at a temperature of 115° C., a load of 60 kg/cm$^2$, an adhesion area of 25 mm × 100 mm, and an adhesion thickness of 0.25 mm. A peeling test was conducted at a peeling rate of 50 mm/min and a temperature of 23° C. The results obtained are shown in Table 5.

TABLE 5

|  | Material to be adhered | Example 34 | Comparative Example 4 |
|---|---|---|---|
| Peeling strength (kg/25 mm) | Aluminum plate | 6.3 | 3.1 |
|  | Cauvas | 6.8 | 4.0 |
|  | Polyethylene sheet | 4.8 | 3.2 |

Examples 35 to 47 and Comparative Example 5

In accordance with Table 6, terminal-modified block copolymers were prepared by treating a block copolymer having lithium at the polymer terminal at 70° C. for 30 minutes with a variety of terminal-treating agents used in an amount equivalent to the initiator used in the polymerization of the block copolymer. After being treated with the terminal-treating agent, the reaction solution was neutralized by addition of dilute aqueous hydrochloric acid, then 2,6-di-tert-butyl-4-methylphenol and tri(nonylphenyl)phosphite were added thereto as a stabilizer respectively in an amount of 0.5 parts by weight relative to 100 parts by weight of the block copolymer, and then the solvent was distilled off by heating the reaction mixture. As to the comparative block copolymer having no terminal-treating agent remainder stipulated for in this invention, a polymer was used which was obtained by treating the block copolymer having lithium at the polymer terminal with methanol to add a hydrogen atom to the terminal.

Then, 100 parts by weight of the terminal-modified block copolymer or the comparative block copolymer was compounded with 30 parts by weight of the powder (400 mesh pass) of a crosslinking product of an isobutylenemaleic anhydride copolymer (the molar ratio of isobutylene to maleic anhydride was 1:1; the crosslinking was conducted by using sodium hydroxide and glycerol glycidyl ether; the water absorption factor of the product was about 200-fold). The resulting mixture was thoroughly kneaded by means of a mixing roll, then formed into a sheet 2 mm in thickness, and the tensile strength of the formed product was determined. Further, a test piece of 3 cm × 4 cm square was cut out of the sheet, and immersed in distilled water for 7 days to determine its water absorption. The results obtained are shown in Table 6.

It can be seen that the compositions comprising the terminal-modified block copolymers stipulated for In this invention compounded therein shown an excellent retention of tensile strength and a good water absorption. Further, the compositions of Examples 35 to 47 showed a good water-holding property.

TABLE 6

|  | Kind of block copolymer | Terminal-treating agent | Tensile strength retention*2) (%) | Water absorption (wt. %) |
|---|---|---|---|---|
| Example |  |  |  |  |
| 35 | Block | 1,3-Dimethyl-2-imidazolidinone | 93 | 160 |
| 36 | copolymer | N-Methylpyrrolidone | 92 | 165 |
| 37 | (A) | N,N'-Dicyclohexylcarbodiimide | 90 | 175 |
| 38 |  | Anisalaniline | 30 | 180 |
| 39 |  | N-Methyl-ε-caprolactam | 87 | 195 |
| 40 |  | Tri(2-methyl-1-aziridinyl)-phenylphosphine oxide | 86 | 200 |
| 41 |  | 3,7-Bis(dimethylamino)-10 benzoylphenothiazine | 85 | 190 |
| 42 |  | Tetraglycidyl-1,3-bisamino-methylcyclohexane | 85 | 205 |
| 43 |  | 4,4'-Bis(dimethylamino)-benzophenone | 80 | 210 |
| 44 |  | Ethylene oxide | 75 | 200 |
| 45 |  | ε-Caprolactam | 76 | 190 |
| 46 |  | Epoxidized soybean oil | 73 | 250 |
| 47 |  | Tetraethoxysilane | 75 | 90 |
| Comparative Example 5 |  | Methanol | 65 | 45 |

Note:
*2

$$\text{Tensile strength retention (\%)} = \frac{\text{Tensile strength of composition after compounding of highly water-absorbing resin}}{\text{Tensile strength of block copolymer before compounding of highly water-absorbing resin}} \times 100$$

EXAMPLES 48 TO 56 AND COMPARATIVE EXAMPLE 6

In the same manner as in Examples 35 to 47, 100 parts by weight of the terminal-modified block copolymers or comparative block copolymer shown in Table 7 were compounded with 50 parts by weight of the fine powder (average particle diameter: about 20 μm) of a vinyl alcohol-acrylic acid salt copolymer, and the compounds were formed into sheet-like formed articles of 2 mm thickness. The properties of the respective formed articles are shown in Table 7. The compositions of Examples 48 to 56 showed a good water-holding property.

TABLE 7

| | Kind of block copolymer | Terminal-treating agent | Tensile strength retention (%) | Water absorption (wt. %) |
|---|---|---|---|---|
| Example | | | | |
| 48 | Block copolymer (E) | N,N'-Dimethylpropyleneurea | 90 | 200 |
| 49 | | 4-Methylbenzylidene-4-butylaniline | 90 | 190 |
| 50 | | Diphenylcyanamide | 88 | 210 |
| 51 | | Diethylaminoethylstyrene | 88 | 160 |
| 52 | | N,N'-Dimethylnicotinamide | 85 | 180 |
| 53 | | N,N,N',N'-Tetramethylthiourea | 85 | 150 |
| 54 | | Triphenylchlorotin | 84 | 110 |
| 55 | | Propanesultone | 70 | 250 |
| 56 | | Tributyl phosphite | 67 | 80 |
| Comparative Example 6 | | Methanol | 50 | 40 |

EXAMPLE 57

The block copolymer (D) having lithium at the polymer terminal was treated at 70° C. for 30 minutes with an amount of N-methylpyrrolidone equivalent to the initiator used in polymerization, to prepare a terminal-modified block copolymer. Then, 100 parts by weight of the block copolymer obtained above was kneaded with 40 parts by weight of the same highly water-absorbing resin as that used in Examples 35 to 47 and 50 parts by weight of naphthenic type process oil to prepare a water absorbing composition. A sheet formed from the composition was immersed in distilled water at 20° C. for 24 hours to determine the water absorption. The water absorption was 400% by weight. It showed also a good water-holding ability.

EXAMPLE 58

A water-absorbing composition was prepared in the same manner as in Example 57 except that a starch-polyacrylic acid graft copolymer was used as the highly water-absorbing resin. The composition showed a water absorption of 150% by weight after being immersed in distilled water at 20° C. for 24 hours.

EXAMPLE 59 AND COMPARATIVE EXAMPLE 7.

The block copolymer (H) having lithium at the polymer terminal was treated at 70° C. for 30 minutes N-methylpyrrolidone used in a proportion of one molecule thereof to one atom of lithium of the initiator used in polymerization, to prepare a terminal-modified block copolymer. Then, 100 parts by weight of the block copolymer obtained above was kneaded with 20 parts by weight of the same terminal-modified block copolymer as that used in Example 36 and 25 parts by weight of the same highly water-absorbing resin as that used in Examples 35 to 47 by means of a twin screw extruder to obtain pellets. The pellets obtained were injection-molded into a plate of 3 mm thickness. For comparison, a similar plate was prepared in the same manner as above except that block copolymers obtained by innactivating the block copolymers (H) and (A) with methanol were used in place of the above-mentioned terminal-modified block copolymers (Comparative Example 7).

The Izod impact strength (determined according to JIS K-7110) and the water absorption after 7 days of immersion in distilled water of these compositions are shown in Table 8.

TABLE 8

| | Example 59 | Comparative Example 7 |
|---|---|---|
| Izod impact strength (kg · cm/cm) | 30 | 19 |
| Water absorption (% by weight) | 50 | 15 |

EXAMPLES 60 TO 65 AND COMPARATIVE EXAMPLE 8

In accordance with Table 9, a block copolymer having lithium at the polymer terminal was treated at 70° C. for 30 minutes with a variety of terminal-treating agents used in a proportion of one molecule thereof relative to one atom of lithium of the initiator used in the polymerization of the block copolymer, to prepare terminal-modified block copolymers. After being treated with the terminal-treating agent, the reaction solution was neutralized by adding a dilute aqueous hydrochloric acid thereto, then 2,6-di-tert-butyl-4-methylphenol and tri(nonylphenyl)phosphite were added to the reaction mixture as a stabilizer each in an amount of 0.5 parts by weight relative to 100 parts by weight of the block copolymer, and then the solvent was distilled away by heating the mixture.

Then, 25 parts by weight of the terminal-modified block copolymer and 75 parts by weight of a methyl methacrylate/styrene/methacrylic acid copolymer (weight ratio of respective constituent monomers: 65/15/20; weight average molecular weight: about 10,000) were melt-kneaded, and then molded to obtain test pieces.

The test results of the properties of respective compositions are shown in Table 9. The compositions of this invention comprising the terminal-modified block copolymers compounded therein showed excellent impact resistance and elongation, and also good compatibility.

TABLE 9

| | Kind of block copolymer | Terminal-treating agent | Property of composition | | | |
|---|---|---|---|---|---|---|
| | | | Izod impact strength (kg · cm/cm) | Tensile strength[3] (kg/cm$^2$) | Elongation [3] (%) | Total light transmission[4] (%) |
| Example | | | | | | |

TABLE 9-continued

|  | Kind of block copolymer | Terminal-treating agent | Property of composition | | | |
|---|---|---|---|---|---|---|
|  |  |  | Izod impact strength (kg · cm/cm) | Tensile strength*3) (kg/cm²) | Elongation *3) (%) | Total light transmission*4) (%) |
| 60 | Block copolymer (A) | 1,3-Dimethyl-2-imidazolidinone | 2.8 | 440 | 50 | 70 |
| 61 |  | N,N'-Dimethylpropyleneurea | 2.5 | 445 | 45 | 69 |
| 62 |  | N-Methyl-ε-caprolactam | 2.4 | 445 | 40 | 68 |
| 63 |  | Epoxidized soybean oil | 2.1 | 450 | 30 | 62 |
| 64 |  | Benzaldehyde | 2.0 | 455 | 30 | 60 |
| 65 |  | ε-Caprolactone | 1.9 | 460 | 25 | 60 |
| Comparative Example 8 |  | Methanol | 1.1 | 480 | 10 | 55 |

Note:
*3)Determined according to JIS K 6871
*4)Determined according to JIS K 6714, by use of a 0.5 mm thick sheet.

EXAMPLES 66 AND 67, AND COMPARATIVE EXAMPLES 9 and 10

The block copolymer (F) having lithium at the polymer terminal was treated with N-methylpyrrolidone used in a proportion of one molecule thereof relative to one lithium atom of the initiator used in the polymerization of the block copolymer, to prepare a terminal-modified block copolymer in the same manner as described above.

Then, 25 parts by weight of the terminal-modified block copolymer obtained above and 75 parts by weight of a thermoplastic polymers shown in Table 10 were melt-kneaded and then molded to obtain test pieces. On the other hand, similar compositions were prepared in a similar manner but by using, as the block copolymer for Comparative Examples, a product obtained by treating the block copolymer having lithium at the polymer terminal with methanol. The test results of physical properties are shown in Table 10.

TABLE 10

|  | Kind of thermoplastic resin | Property of composition | | | |
|---|---|---|---|---|---|
|  |  | Izod impact strength (with notch) (kg · cm/cm) | Tensile strength (kg/cm²) | Elongation (%) | Total light transmission (%) |
| Example 66 | Styrene/Methacrylic acid (wt. ratio 92/8) | 2.0 | 375 | 30 | 66 |
| Comp. Ex. 9 |  | 1.3 | 400 | 10 | 58 |
| Example 67 | Styrene/maleic anhydride (wt. ratio 90/10) | 2.2 | 400 | 25 | 62 |
| Comp. Ex. 10 |  | 1.3 | 400 | 10 | 55 |

EXAMPLES 68 TO 70 AND COMPARATIVE EXAMPLES 11 TO 13

The block copolymer (A) was treated with tetraglycidyl-1,3-bisaminomethylcyclohexane used in a proportion of one molecule thereof relative to one lithium atom of the initiator used in the polymerization of the block copolymer, and the reaction mixture was then treated in the same manner as described above to obtain a terminal-modified block copolymer.

Then, 20 parts by weight of the terminal-modified block copolymer obtained above and 80 parts by weight of thermoplastic polymers shown in Table 11 were melt-kneaded and then molded to obtain test pieces. In the Comparative Examples, on the other hand, a product obtained by treating the block copolymer (A) with methanol was used. The test results of the physical properties are shown in Table 11.

EXAMPLES 71 TO 73 AND COMPARATIVE EXAMPLES 14 TO 16

Compositions were prepared as shown in Table 12. Their properties are also shown in the same table.

TABLE 11

|  | Kind of thermoplastic polymer | Property of composition | | |
|---|---|---|---|---|
|  |  | Izod impact strength (with notch) (kg · cm/cm) | Tensile strength (kg/cm²) | Elongation (%) |
| Example 68 | Nylon-66 | 12.5 | 465 | 45 |
| Comparative Example 11 |  | 7.0 | 470 | 35 |
| Example 69 | Nylon-6 | 9.1 | 420 | 65 |
| Comparative Example 12 |  | 5.5 | 430 | 50 |
| Example 70 | Polybutylene terephthalate | 3.6 | 460 | 32 |
| Comparative Example 13 |  | 2.3 | 480 | 15 |

TABLE 12

|  | Example 71 | Comparative Example 14 | Example 72 | Comparative Example 15 | Example 73 | Comparative Example 16 |
|---|---|---|---|---|---|---|
| Composition (parts by weight) | | | | | | |
| Terminal-modified block copolymer (The same block copolymer as that of Example 1) | 15 | — | 15 | — | 15 | — |
| Comparative Example block copolymer (The same block copolymer | — | 15 | — | 15 | — | 15 |

TABLE 12-continued

|  | Example 71 | Comparative Example 14 | Example 72 | Comparative Example 15 | Example 73 | Comparative Example 16 |
|---|---|---|---|---|---|---|
| as that of Comparative Example 1) |  |  |  |  |  |  |
| Methacrylic acid/styrene/methyl methacrylate/acrylonitrile copolymer (20/50/10/20) | 45 | 45 | — | — | — | — |
| α-Methylstyrene/styrene/acrylonitrile copolymer (50/25/25) | — | — | 35 | 35 | 25 | 25 |
| Polyvinyl chloride | 40 | 40 | — | — | 10 | 10 |
| Polymethyl methacrylate | — | — | 50 | 50 | — | — |
| Polycarbonate | — | — | — | — | 50 | 50 |
| Izod impact strength (with notch, kg · cm/cm) | 9.1 | 7.0 | 5.5 | 4.1 | 38.5 | 31.2 |

EXAMPLES 74 AND 75, AND COMPARATIVE EXAMPLES 17 AND 18 in the same manner as above, the block copolymer (I) was treated with N,N'-dicyclopentadienylcarbodiimide to obtain a terminal-modified block copolymer, which was then melt-kneaded with the thermoplastic polymers shown in Table 13 to prepare compositions. In the Comparative Examples, a product obtained by treating the block copolymer (I) with methanol was used as the block copolymer for the Comparative Examples.

TABLE 13

|  | Example 74 | Comparative Example 17 | Example 75 | Comparative Example 18 |
|---|---|---|---|---|
| Composition (part by weight) |  |  |  |  |
| Terminal-modified block copolymer | 10 | — | 75 | — |
| Comparative Example block copolymer | — | 10 | — | 75 |
| Polyphenylene ether resin ([η] = 0.42) | 30 | 30 | — | — |
| Rubber-modified styrene-maleic anhydride copolymer | 60 | 60 | — | — |
| Styrene/methyl methacrylate copolymer (wt. ratio 70/30) | — | — | 20 | 20 |
| Styrene/methyl methacrylate/methacrylic acid (wt. ratio 70/25/5) | — | — | 5 | 5 |
| Izod impact strength (with notch, kg · cm/cm) | 15.9 | 12.5 | 22.5 | 18.2 |

EXAMPLES 76 TO 78 AND COMPARATIVE EXAMPLES 19 TO 21

The block copolymer (G) was treated with tetraglycidyl-m-xylenediamine used in a proportion of one molecule thereof relative to one lithium atom of the initiator used in the polymerization of the block copolymer, and the reaction mixture was subsequently treated in the same manner as described above to obtain a terminal-modified block copolymer.

The terminal-modified block copolymer obtained above was melt-kneaded with a thermoplastic polyurethane to obtained compositions. These compositions were pressure-adhered to polyvinyl chloride sheets at 180° C., and the peeling strength of the adhesion was determined. The results obtained are shown in Table 14. In the Comparative Examples, the compositions were prepared by using as the Comparative Example block copolymer a product obtained by treating the block copolymer (G) with methanol.

TABLE 14

|  | Example | | | Comparative Example | | |
|---|---|---|---|---|---|---|
|  | 76 | 77 | 78 | 19 | 20 | 21 |
| Composition (part by weight) |  |  |  |  |  |  |
| Terminal-modified block copolymer | 10 | 60 | 90 | — | — | — |
| Comparative Example block copolymer | — | — | — | 10 | 60 | 90 |
| Polyurethane | 90 | 40 | 10 | 90 | 40 | 10 |
| Peeling strength[*5] (kg/25 mm) | 11.0 | 10.2 | 7.1 | 9.6 | 5.3 | 3.1 |

Note:
[*5] Determined according to JIS K 6854

EXAMPLES 79 AND 80, AND COMPARATIVE EXAMPLES 22 TO 24

A terminal-modified block copolymer was obtained by treating the block copolymer (A) with propanesultone in the same manner as described above. The terminal-modified block copolymer was melt-kneaded with an ethylene-vinyl alcohol copolymer and polyethylene to prepare compositions. The properties of the compositions are shown in Table 15. In the Comparative Examples, a product obtained by treating the block copolymer (A) with methanol was used as the Comparative Example block copolymer.

EXAMPLE 81

In the same manner as described above, a terminal-modified block copolymer was obtained by treating the block copolymer (F) with an equimolar amount of tetraethoxysilane. Then, a composition was prepared which comprises 10 parts by weight of the terminal-modified block copolymer, 30 parts by weight of nylon 6, 30 parts by weight of styrene-methacrylic acid copolymer, and 30 parts by weight of glass fiber. The composition was excellent in impact resistance and thermal resistance.

TABLE 15

|  | Example | | Comparative Example | | |
|---|---|---|---|---|---|
|  | 79 | 80 | 22 | 23 | 24 |
| Composition (part by weight) | | | | | |
| Terminal-modified block copolymer | 75 | 90 | — | — | 100 |
| Comparative Example block copolymer | — | — | 75 | 90 | — |
| Ethylene-vinyl alcohol copolymer | 20 | 10 | 20 | 10 | — |
| Polyethylene | 5 | — | 5 | — | — |
| Property of composition | | | | | |
| Hardness*[6] (JIS) | 87 | 85 | 86 | 84 | 84 |
| Tensile strength at 300% elongation*[6] (kg/cm$^2$) | 43 | 35 | 36 | 29 | 25 |
| Tensile strength*[6] (kg/cm$^2$) | 110 | 135 | 93 | 115 | 150 |
| Oil resistance*[7] (weight increase ratio) (%) | 35 | 56 | 60 | 66 | 75 |

Note:
*[6]Determined according to JIS K 6301
*[7]Determined according to JIS K 6301; JIS No. 3 Oil; 23° C., 22 hours

EXAMPLES 82 TO 94 AND COMPARATIVE EXAMPLE 25

In accordance with Table 16, a block copolymer having lithium at the polymer terminal was treated at 70° C. for 30 minutes with a variety of terminal-treating agents used in a proportion of one molecule thereof relative to one lithium atom of the initiator used in the polymerization of the block copolymer, to prepare terminal-modified block copolymers. After treatment with the terminal-treating agent, the reaction solution was neutralized by adding dilute aqueous hydrochloric acid thereto, and then 2,6-di-tert-butyl-4-methylphenol and tri(nonylpheny)phosphite were added to the reaction mixture as a stabilizer each in an amount of 0.5 parts by weight relative to 100 parts by weight of the block copolymer, and then the solvent was distilled away by heating the reaction mixture.

Then, 100 parts by weight of the terminal-modified block copolymers or comparative block copolymer and 20 parts by weight of Ketjen black EC (mfd. by Nippon EC Kabushiki Kaisha), as carbon black, were kneaded by means of a twin screw extruder to prepare electroconductive compositions. The properties of the compositions thus obtained are shown in Table 16, which reveals that compositions comprising the modified block copolymers stipulated for in this invention compounded therein are excellent in tensile strength, show good characteristics in permanent elongation at break, and are thus more rubberlike electroconductive compositions.

TABLE 16

|  | Kind of block copolymer | Terminal-treating agent | Volume resistivity *[8] ($\Omega \cdot$ cm) | Tensile strength *[6] (kg/cm$^2$) | Elongation *[6] (%) | Permanent elongation at break *[9] (%) |
|---|---|---|---|---|---|---|
| 82 | Block copolymer (A) | 1,3-Dimethyl-2-imidazolidinone | $1 \times 10^2$ | 143 | 490 | 40 |
| 83 | | N-Methylpyrrolidone | $8 \times 10$ | 140 | 480 | 43 |
| 84 | | N,N'-Methyldicyclohexylcarbodiimide | $5 \times 10$ | 150 | 460 | 40 |
| 85 | | Anisalaniline | $6 \times 10$ | 145 | 465 | 40 |
| 86 | | N-Methyl-ε-caprolactam | $6 \times 10$ | 140 | 475 | 45 |
| 87 | | Tri(2-methyl-1-aziridinyl)phenylphosphine oxide | $1 \times 10$ | 135 | 480 | 50 |
| 88 | | 3,7-Bis(dimethylamino)-10-benzoylphenothiazine | $1 \times 10^2$ | 125 | 500 | 55 |
| 89 | | Tetraglycidyl-1,3-bis-aminomethylcyclohexane | $1 \times 10$ | 135 | 495 | 53 |
| 90 | | 4,4'-Bis(diethylamino)-benzophenone | $6 \times 10$ | 130 | 480 | 56 |
| 91 | | Ethylene oxide | $5 \times 10$ | 120 | 500 | 60 |
| 92 | | ε-Caprolactam | $6 \times 10$ | 123 | 510 | 60 |
| 93 | | Epoxidized soybean oil | $6 \times 10$ | 125 | 540 | 62 |
| 94 | | Tetraethoxysilane | $1 \times 10^2$ | 135 | 470 | 45 |
| Comparative Example 25 | | Methanol | $1 \times 10^2$ | 110 | 500 | 87 |

Note:
*[6]Described before
*[8]Electroconductive paste was coated to the both ends of a molded piece 2 cm × 5 cm × 0.2 cm in dimension, and dried. Volume resistivity was then determined with a digital Multimeter (mfd. by Yokogawa-Hokushin Electric Corp.)
*[9]Determined according to ASTM D412.

EXAMPLES 95 TO 103 AND COMPARATIVE EXAMPLE 26

Terminal-modified block copolymers shown in Table 17 were prepared in the same manner as in Examples 82 to 94. Then, 100 parts by weight of the terminal-modified block copolymers or comparative block copolymer and 10 parts by weight of Ketjen black EC were kneaded by means of a twin screw extruder to prepare electroconductive compositions. The properties of the respective compositions obtained are shown in Table 17.

TABLE 17

| | Kind of block copolymer | Terminal-treating agent | Volume resistivity *8) (Ω · cm) | Tensile strength *6) (kg/cm²) | Elongation *6) (%) | Permanent elongation at break *9) (%) |
|---|---|---|---|---|---|---|
| 95 | Block copolymer (E) | N,N-Dimethylpropyleneurea | $6 \times 10^5$ | 120 | 760 | 38 |
| 96 | | 4-Methoxybenzylidene-4-butylaniline | $5 \times 10^5$ | 125 | 750 | 36 |
| 97 | | Diphenylcyanamide | $3 \times 10^5$ | 130 | 740 | 35 |
| 98 | | Diethylaminoethylstyrene | $9 \times 10^5$ | 110 | 850 | 45 |
| 99 | | N,N'-Dimethylnicotinamide | $8 \times 10^5$ | 118 | 800 | 40 |
| 100 | | N,N,N',N'-Tetramethylthiourea | $1 \times 10^6$ | 107 | 870 | 50 |
| 101 | | Triphenylchlorotin | $4 \times 10^5$ | 116 | 780 | 42 |
| 102 | | Propanesultone | $1 \times 10^5$ | 105 | 880 | 52 |
| 103 | | Tributyl phosphite | $2 \times 10^6$ | 103 | 900 | 55 |
| Comparative Example 26 | | Methanol | $3 \times 10^6$ | 86 | 810 | 70 |

EXAMPLE 104 AND COMPARATIVE EXAMPLE 27

The block copolymer (D) having lithium at the polymer terminal was treated at 70° C. for 30 minutes with 1,3-dimethyl-2-imidazolidinone used in a proportion of one molecule thereof relative to one lithium atom of the initiator used in polymerization, to prepare a terminal-modified block copolymer. Then, 100 parts by weight of the block copolymer obtained above was kneaded with 35 parts by weight of Vesfight CFTAC6-S (mfd. by Toho Vesron) as a carbon fiber, 80 parts by weight of naphthenic type process oil, 15 parts by weight of polystyrene, and 30 parts by weight of calcium carbonate by means of a twin screw extruder to obtain an electroconductive composition (Example 104 ). Further, as a Comparative Example, a similar composition (Comparative Example 27) was prepared by using a block copolymer obtained by innactivating the block copolymer (D) with methanol in place of the abovementioned terminal-modified block copolymer. The properties of these compositions are shown in Table 18.

TABLE 18

| | Example 104 | Comparative Example 27 |
|---|---|---|
| Volume resistivity (Ω · cm) | $3 \times 12^2$ | $9 \times 10^2$ |
| Tensile strength (kg/cm²) | 63 | 42 |
| Elongation (%) | 760 | 750 |
| Tear strength (kg/cm²) | 35 | 25 |

EXAMPLE 105 AND COMPARATIVE EXAMPLE 28

The block copolymer (H) having lithium at the polymer terminal was treated at 70° C. for 30 minutes with tributylchlorotin used in a proportion of one molecule thereof relative to one lithium atom of the initiator used in polymerization, to prepare a terminal-modified block copolymer. Then, 80 parts by weight of the terminal-modified block copolymer and 20 parts by weight of the same terminal-modified block copolymer as that used in Example 101 were kneaded with 10 parts by weight of the same carbon black as used above and 10 parts by weight of carbon fiber by means of a twin screw extruder to obtain pellets. The pellets obtained were injection-molded to prepare an electroconductive molded article (Example 105). For comparison, block copolymers obtained by innactivating the block copolymers (H) and (E) with methanol were used to prepare a similar molded article (Comparative Example 28). The properties of these are shown in Table 19.

TABLE 19

| | Example 105 | Comparative Example 28 |
|---|---|---|
| Volume resistivity (Ω · cm) | $3 \times 10$ | $8 \times 10$ |
| Izod impact strength (kg · cm/cm) | 10.5 | 7.2 |

We claim:

1. A terminal-modified block copolymer having a terminal-treating agent bonded to the polymer terminal which is obtained by treating an active terminal of a block copolymer which comprises conjugated dienes and vinyl-aromatic hydrocarbon compounds and which is obtained by use of at least one member selected from alkali metals or organoalkali metals as a polymerization initiator and has a vinyl aromatic hydrocarbon content of 5 to 95% by weight and a number average molecular weight of 5,000 to 1,000,000 with at least one terminal-treating agent selected from the group consisting of compounds having at least one >C=N— linkage in their molecule, compounds having at least one —N=C—=N— linkage in their molecule, compounds having at least one >N—C=N linkage in their molecule, and compounds represented by the general formula

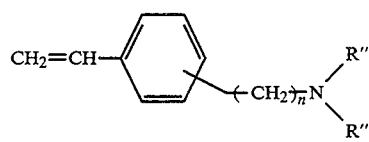

wherein R" is an alkyl group of 1 to 22 carbon atoms, cycloalkyl group, arylalkyl group, aryl group, or substituted aryl group; and n is an integer of 0 to 6.

2. A terminal-modified block copolymer according to claim 1 wherein a living block copolymer obtained by using at least one member selected from lithium or organolithium compounds as a polymerization initiator is used.

3. A terminal-modified block copolymer according to claim 1 or 2 wherein the vinylaromatic hydrocarbon content is 5 to 60% by weight.

4. A terminal-modified block copolymer according to claim 1 or 2 wherein the vinylaromatic hydrocarbon content is more than 60% by weight and not more than 95% by weight.

5. A terminal-modified block copolymer according to claim 1 or 2 wherein said terminal-treating agent is at least one compound selected from the group consisting of benzylideneaniline, anisalaniline, 4-methoxybenzylidene-4-n-butylaniline, 4-methoxybenzylidene-4-acetoxyaniline, N,N'-dicyclohexylcarbodiimide, N,N'-diphenylcarbodiimide and N-cyclohexyl-2-benzothiazoylsulfenamide.

6. A terminal-modified block copolymer according to claim 1 or 2 wherein said terminal-treating agent is at least one compound selected from the group consisting of dicyclohexylcyanamide and diphenylcyanamide.

7. A terminal-modified block copolymer according to claim 1 or 2 wherein said terminal-treating agent is at least one compound selected from the group consisting of p-(2-dimethylaminoethyl)styrene, m-(2-dimethylaminoethyl)styrene, p-(2-diethylaminoethyl)styrene and m-(2-diethylaminoethyl)styrene.

8. A terminal-modified block copolymer according to claim 1, wherein said terminal-treating agent is selected from the group consisting of benzylidenaniline, anisalaniline, 4-methoxybenzylidene-4-n-butylamine, 4-methoxybenzylidene-4-acetoxyaniline, benzylidenethylamine, benzylideneazine, N-trimethylsilylbenzylideneamine, N-triphenylsilyl-benzylideneamine, N-trimethylsilyl(1-phenylbenzylidene)-amine, N-butyldenebenzenesulfenamide, N-isopropylidenebenzenesulfenamide, N-benzylidenebenzenesulfenamide, N-ethylidenebenzenesulfenamide, N-(α-phenylbenzylidene)-benzenesulfenamide, N-(α-methylbenzylidene)benzenesulfenamide, dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, phenylbenxylcarbodiimide, dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenylcyanamide, and phenylbenzylcyanamide.

9. A process for producing a terminal-modified block copolymer having a terminal-treating agent bonded to the polymer terminal which comprises treating an active terminal of a block copolymer comprising conjugated dienes and vinylaromatic hydrocarbon compounds which is obtained in a hydrocarbon solvent by use of at least one member selected from the group consisting of alkali metals and organo-alkali metals as a polymerization initiator, with at least one terminal-treating agent selected from the group consisting of compounds having at least one >C=N— linkage in their molecule, compounds having at least one —N=C-=N— linkage in their molecule, compounds having at least one >N—C=N linakage in their molecule, and compounds represented by the general formula

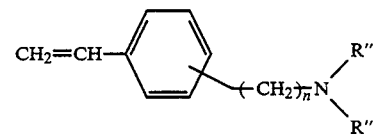

wherein R" is an alkyl group of 1 to 22 carbon atoms, cycloalkyl group, arylalkyl group, aryl group, or substituted aryl group; and n is an integer of 0 to 6, in a proportion of 0.7 to 2 molecules of said terminal-treating agent relative to one atom of the alkali metal present at the polymer terminal.

10. A composition which comprises:
(a) 2 to 98 parts by weight of a terminal-modified block copolymer having a terminal-treating agent bonded to the polymer terminal which is obtained by treating an active terminal of a block copolymer which comprises conjugated dienes and vinylaromatic hydrocarbon compounds and which is obtained by use of at least one member selected from the group consisting of alkali metals and organoalkali metals as a polymerization initiator and has a vinylaromatic hydrocarbon content of 5 to 95% by weight and a least one terminal-treating agent selected from the compounds containing at least one functional group represented by the following general formula

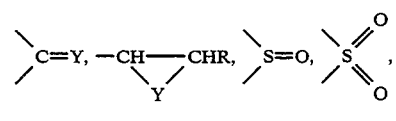

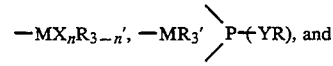

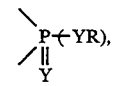

wherein R is hydrogen, an alkyl group of 1 to 22 carbon atoms, cycloalkyl group of 4 to 22 carbon atoms, aryl group of 6 to 22 carbons, or arylalkyl group, R' is the same as R or is an alkoxy group; M is silicon or tin; X is a halogen; Y is sulfur, Z is oxygen, sulfur or nitrogen, and n is an integer of 1 to 3, or compounds represented by the following general formula

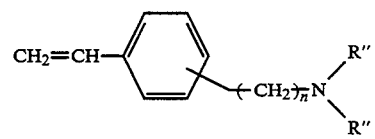

wherein R" is an alkyl group of 1 to 22 atoms, cycloalkyl group, arylalkyl group, aryl group, or substituted aryl group; and n is an integer of 0 to 6, and
(b) 98 to 2 parts by weight of a resinous substance which comprises (1) at least one highly water-absorbing crosslinking resin selected from the group consisting of the crosslinking product of the reaction product of a copolymer of maleic acid or the anhydride thereof and α-olefin with an alkali metal compound, alkaline earth metal compound, ammonia or amine; the crosslinking product of the reaction product of a copolymer of maleic acid or the derivative thereof and a vinyl of vinylidene compound with an alkali metal compound, alkaline earth metal compound, ammonia or amine; and the crosslinking product of the reaction product of a copolymer of acrylic or methacrylic acid and a vinyl or vinylidene compound with an alkali metal compound, alkaline earth metal compound, ammonia or amine; or (2) at least one polar thermoplastic polymer selected from the group consisting of aliphatic unsaturated carboxylic acid-containing polymer, polyamide polymer, polyester polymer, thermoplastic polyurethane polymer, vinyl alcohol polymer, polyoxymethylene polymer, polycarbonate polymer, polysulfone polymer, polyphenylene ether polymer, polyarylene sulfide polymer and polyvinyl chloride polymer.

11. A composition according to claim 10 wherein the terminal-modified block copolymer is obtained by using a living block copolymer obtained by using as a polymerization initiator at least one member selected from the group consisting of lithium and organolithium compounds.

12. A composition according to claim 10 wherein a terminal-modified block copolymer having a vinylaromatic hydrocarbon content of 5 to 60% by weight is used.

13. A composition according to claim 10 wherein the vinylaromatic hydrocarbon content is more than 60% by weight and not more than 95% by weight.

14. A composition according to claim 10 wherein the terminal-treating agent is at least one compound selected from the group consisting of compounds having at least one >C=N— linkage in their molecule, compounds having at least one —N=C=N— linkage in their molecule, compounds having at least one >N—C=N linkage in their molecule, and compounds represented by the general formula

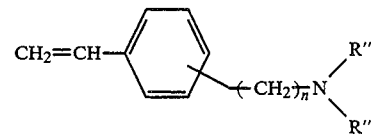

wherein R" is an alkyl group of 1 to 22 carbon atoms, cycloalkyl group, arylalkyl group, aryl group, or substituted aryl group; and n is an integer of 0 to 6.

15. A composition according to claim 14 wherein said terminal-treating agent is at least one compound selected from the group consisting of benzylideneaniline, anisalaniline, 4-methoxybenzylidene-4-n-butylaniline, 4-methoxybenzylidene-4-acetoxyaniline, N,N'-dicyclohexylcarbodiimide, N,N'-diphenylcarbodiimide, and N-cyclohexyl-2-benzothiazylsulfenamide.

16. A composition according to claim 14 wherein said terminal-treating agent is at least one compound selected from the group consisting of dicyclohexylcyanamide and diphenylcyanamide.

17. A composition according to claim 10 wherein said terminal-treating agent is at least one compound selected from the group consisting of p-(2-dimethylaminoethyl) styrene, m-(2-di-methylaminoethyl)styrene, p-(2-diethylaminoethyl)styrene, and m-(2-diethylaminoethyl)styrene.

18. A composition according to claim 10, wherein said terminal-treating agent is selected from the group consisting of benzylidenaniline, anisalaniline, 4-methoxybenzylidene-4-n-butylamine, 4-methoxybenzylidene-4-acetoxyaniline, benzylidenethylamine, benzylideneazine, N-trimethylsilylbenzylideneamine,N-triphenylsilyl-benzylideneamine, N-trimethylsilyl(1-phenylbenzylidene)-amine, N-butyldenebenzenesulfenamide, N-isopropylidenebenzenesulfenamide, N-benzylidenebenzenesulfenamide, N-ethylidenebenzenesulfenamide, N-(α-phenylbenzylidene)-benzenesulfenamide, N-(α-methylbenzylidene)benzenesulfenamide, dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide, phenylbenxylcarbodiimide, dimethylcyanamide, diethylcyanamide, dipropylcyanamide, dibutylcyanamide, dihexylcyanamide, dicyclohexylcyanamide, dibenzylcyanamide, diphenylcyanamide, methylpropylcyanamide, butylcyclohexylcyanamide, ethylbenzylcyanamide, propylphenylcyanamide, and phenylbenzylcyanamide.

* * * * *